United States Patent
Kojima et al.

(10) Patent No.: US 8,349,415 B2
(45) Date of Patent: Jan. 8, 2013

(54) LIQUID-CRYSTALLINE MEDIUM AND LIQUID-CRYSTAL DISPLAY HAVING HIGH TWIST

(75) Inventors: Akihiro Kojima, Atsugi (JP); Fumio Shimano, Miura (JP)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 22 days.

(21) Appl. No.: 13/167,310

(22) Filed: Jun. 23, 2011

(65) Prior Publication Data

US 2011/0315924 A1    Dec. 29, 2011

(30) Foreign Application Priority Data

Jun. 25, 2010  (EP) ..................... 10006620

(51) Int. Cl.
*C09K 19/12* (2006.01)
*C09K 19/30* (2006.01)
*C09K 19/34* (2006.01)
*C09K 19/20* (2006.01)
*C09K 19/54* (2006.01)

(52) U.S. Cl. ............... 428/1.1; 252/299.01; 252/299.61; 252/299.63; 252/299.66; 252/299.67

(58) Field of Classification Search .................. 428/1.1; 252/299.01, 299.5, 299.61, 299.63, 299.66, 252/299.67

See application file for complete search history.

(56) References Cited

U.S. PATENT DOCUMENTS

| | | | |
|---|---|---|---|
| 6,858,268 B2* | 2/2005 | Suermann et al. ............. 428/1.1 |
| 7,887,717 B2* | 2/2011 | Kojima et al. ........... 252/299.63 |
| 2010/0308266 A1* | 12/2010 | Yanai et al. ............... 252/299.61 |

FOREIGN PATENT DOCUMENTS

| DE | 102004062962 A1 * | 8/2005 |
| EP | 405346 A2 * | 1/1991 |

* cited by examiner

*Primary Examiner* — Shean C Wu
(74) *Attorney, Agent, or Firm* — Millen, White, Zelano & Branigan, P.C.

(57) ABSTRACT

The present invention relates to a liquid-crystalline medium having high twist, to the use thereof for electro-optical purposes, and to displays containing this medium.

19 Claims, No Drawings

LIQUID-CRYSTALLINE MEDIUM AND LIQUID-CRYSTAL DISPLAY HAVING HIGH TWIST

The present invention relates to a liquid-crystalline medium having high twist, to the use thereof for electro-optical purposes, and to displays containing this medium.

Liquid-crystal displays are known from the prior art. The commonest display devices are based on the Schadt-Helfrich effect and contain a liquid-crystal medium having a twisted nematic structure, such as, for example, TN ("twisted nematic") cells having twist angles of typically 90° and STN ("super-twisted nematic") cells having twist angles of typically from 180 to 270°. Also known are ferroelectric liquid-crystal displays which contain a liquid-crystal medium having a twisted smectic structure. The twisted structure in these displays is usually achieved by addition of one or more chiral dopants to a nematic or smectic liquid-crystal medium.

Also known are liquid-crystal displays which contain liquid-crystal (LC) media having a chiral nematic or cholesteric structure. These media have significantly higher twist compared with the media from TN and STN cells.

Cholesteric liquid crystals exhibit selective reflection of circular-polarized light, with the direction of rotation of the light vector corresponding to the direction of rotation of the cholesteric helix. The reflection wavelength $\lambda$ is given by the pitch p of the cholesteric helix and the mean birefringence n of the cholesteric liquid crystal in accordance with equation (1):

$$\lambda = n \cdot p \qquad (1)$$

The terms "chiral nematic" and "cholesteric" are used alongside one another in the prior art. "Chiral nematic" frequently denotes LC materials consisting of a nematic host mixture which has been doped with an optically active component which induces a helically twisted superstructure. By contrast, "cholesteric" frequently denotes chiral LC materials, for example cholesteryl derivatives, which have a "natural" cholesteric phase having a helical twist. The two terms are also used in parallel to denote the same thing. In the present application, the term "cholesteric" is used for both above-mentioned types of LC material, with this term being intended to cover the widest meaning of "chiral nematic" and "cholesteric" in each case.

Examples of customary cholesteric liquid-crystal (CLC) displays are the so-called SSCT ("surface stabilized cholesteric texture") and PSCT ("polymer stabilized cholesteric texture") displays. SSCT and PSCT displays usually contain a CLC medium which has, for example in the initial state, a planar structure which reflects light having a certain wavelength, and can be switched into a focally conical, light-scattering structure by application of an electrical alternating-voltage pulse, or vice versa. On application of a stronger voltage pulse, the CLC medium is converted into a homeotropic, transparent state, from where it relaxes into the planar state after rapid switching-off of the voltage or into the focally conical state after slow switching-off.

The planar alignment of the CLC medium in the initial state, i.e. before application of a voltage, is achieved in SSCT displays by, for example, surface treatment of the cell walls. In PSCT displays, the CLC medium additionally comprises a phase-separated polymer or polymer network which stabilizes the structure of the CLC medium in the respective addressed state.

SSCT and PSCT displays generally do not require backlighting. In the planar state, the CLC medium in a pixel exhibits selective light reflection of a certain wavelength in accordance with the above equation (1), meaning that the pixel appears in the corresponding reflection color, for example in front of a black background. The reflection color disappears on changing into the focally conical, scattering or homeotropic, transparent state.

SSCT and PSCT displays are bistable, i.e. the respective state is retained after the electric field has been switched off and is only converted back into the initial state by application of a fresh field. In order to produce a pixel, a short voltage pulse is therefore sufficient, in contrast, for example, to electro-optical TN or STN displays, in which the LC medium in an addressed pixel immediately returns to the initial state after the electric field has been switched off, meaning that maintenance of the addressing voltage is necessary for durable production of a pixel.

For the above-mentioned reasons, CLC displays have significantly lower power consumption compared with TN or STN displays. In addition, they exhibit only slight viewing-angle dependence, or none at all, in the scattering state. In addition, they do not require active-matrix addressing as in the case of TN displays, but instead can be operated in the simpler multi-plex or passive-matrix mode.

WO 92/19695 and U.S. Pat. No. 5,384,067 describe, for example, a PSCT display containing a CLC medium having positive dielectric anisotropy and up to 10% by weight of a phase-separated polymer network which is dispersed in the liquid-crystal material. U.S. Pat. No. 5,453,863 describes, for example, an SSCT display containing a polymer-free CLC medium having positive dielectric anisotropy. The disclosures of WO 92/19695, U.S. Pat. Nos. 5,384,067, and 5,453,863 are hereby incorporated by reference.

A CLC medium for the above-mentioned displays can be prepared, for example, by doping a nematic LC mixture with a chiral dopant having a high twisting power. The pitch p of the induced cholesteric helix is then given by the concentration c and the helical twisting power HTP of the chiral dopant in accordance with equation (2):

$$p = (HTP \cdot c)^{-1} \qquad (2)$$

It is also possible to use two or more dopants, for example in order to compensate for the temperature dependence of the HTP of the individual dopants and thus to achieve low temperature dependence of the helix pitch and the reflection wavelength of the CLC medium.

For use in the above-mentioned displays, the chiral dopants should have the highest possible helical twisting power and low temperature dependence, high stability and good solubility in the liquid-crystalline host phase. In addition, they should have as little adverse effect as possible on the liquid-crystalline and electro-optical properties of the liquid-crystalline host phase. A high helical twisting power of the dopants is desired, inter alia for achieving small pitches, for example in cholesteric displays, but also in order to be able to reduce the concentration of the dopant. This firstly achieves a reduction in potential impairment of the properties of the liquid-crystal medium by the dopant and secondly increases the latitude regarding the solubility of the dopant, also enabling, for example, dopants of relatively low solubility to be used.

In general, CLC materials for use in the above-mentioned displays must have good chemical and thermal stability and good stability to electric fields and electromagnetic radiation. Furthermore, the liquid-crystal materials should have a broad cholesteric liquid-crystal phase having a high clearing point, sufficiently high birefringence, high positive dielectric anisotropy and low rotational viscosity.

The CLC materials should in addition be of such a nature that different reflection wavelengths, in particular in the visible region, can be achieved by simple and targeted variation. Furthermore, they should have low temperature dependence of the reflection wavelength.

Since liquid crystals are generally used in the form of mixtures of a plurality of components, it is important that the components are readily miscible with one another. Further properties, such as the dielectric anisotropy and the optical anisotropy, have to meet different requirements depending on the cell type.

However, it is not possible to achieve favorable values for all the above-mentioned parameters using the media available from the prior art.

EP 0 450 025 describes, for example, a cholesteric liquid-crystal mixture consisting of a nematic liquid crystal comprising two or more chiral dopants. However, the mixtures shown therein have only low clearing points. In addition, they comprise a high proportion of 26% of chiral dopants. However, high concentrations of dopant generally result in an impairment of the liquid-crystalline and electro-optical properties of the CLC medium.

The materials known from the prior art for CLC displays often do not have sufficiently broad LC phases, sufficiently low viscosity values and sufficiently high values of the dielectric anisotropy. In addition, they require high switching voltages and often do not have birefringence values matched to the requisite LC layer thickness.

Thus, for example for many CLC displays, a CLC medium having high birefringence Δn is necessary in order to achieve high reflectivity, while other CLC displays, for example displays whose priority is high color saturation (multicolor CLC displays), require a low value of Δn. However, it has been found that a lowering of the birefringence while simultaneously retaining the high polarity of the CLC medium which is necessary for low switching voltages cannot be achieved to an adequate extent using the CLC media known from the prior art.

There is thus a great demand for CLC media having high twist, a large working-temperature range, short response times, a low threshold voltage, low temperature dependence of the reflection wavelength and in particular low values of the birefringence which do not have the disadvantages of the media known from the prior art, or only do so to a lesser extent.

For use in CLC displays, in particular in SSCT displays, the CLC media should in addition simultaneously have good dielectric behavior, a broad operating-temperature range and good color saturation.

An object of the invention is to provide CLC media, in particular for use in CLC displays such as SSCT and PSCT displays, and other bistable CLC displays which have the above-mentioned required properties and do not have the disadvantages of the media known from the prior art, or only do so to a lesser extent.

Upon further study of the specification and appended claims, other objects and advantages of the invention will become apparent.

It has been found that these objects can be achieved if media according to the invention are used in displays of this type.

The invention relates to a liquid-crystalline (LC) medium having a helically twisted structure comprising a nematic component and an optically active component, characterized in that the optically active component comprises one or more chiral compounds whose helical twisting power and concentration are selected in such a way that the helix pitch of the medium is ≦1 μm, and the nematic component comprises one or more compounds of formula I,

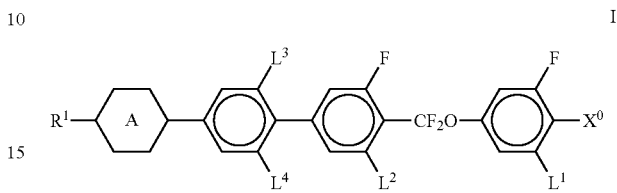

I in which $R^1$ is H or an alkyl or alkenyl radical having up to 20 carbon atoms which is unsubstituted, monosubstituted by CN or $CF_3$ or at least monosubstituted by halogen, and wherein one or more $CH_2$ groups are optionally each, independently of one another, replaced by —O—, —S—, —CO—, —CO—O—, —O—CO—, —O—CO—O—, —CH=CH— or —C≡C— in such a way that O atoms are not linked directly to one another,

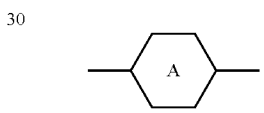

is

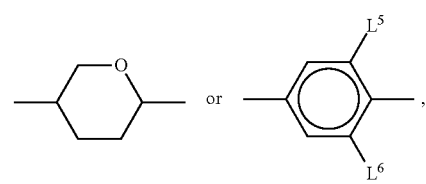

$X^0$ F, Cl or alkyl, alkenyl or alkoxy, each of which is halogenated and has up to 6 C-atoms, and $L^{1-6}$ are each, independently of one another, H or F.

Preferably the nematic component comprises, in addition to the compounds of formula I, one or more compounds of formula II and/or one or more compounds of formula III

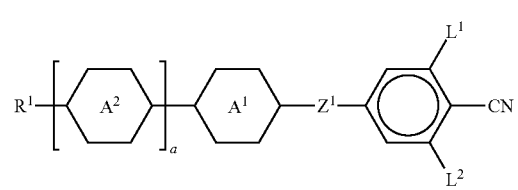

II

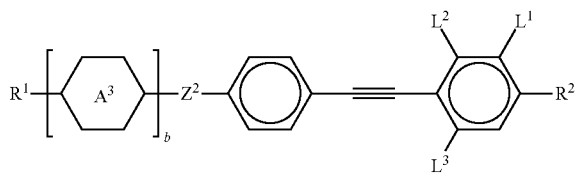

in which
R$^1$ and R$^2$ independently of one another, have one of the meanings of R$^1$ given in formula I,

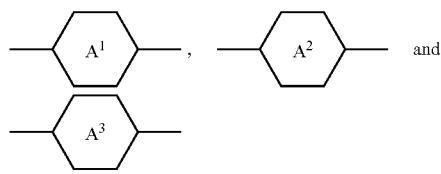

are independently of one another

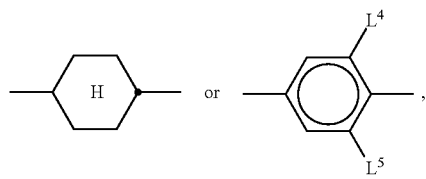

Z$^1$ is —COO—, —CH$_2$CH$_2$— or a single bond,
Z$^2$ is —COO—, —CH$_2$CH$_2$— or a single bond,
L$^{1-5}$ are each, independently of one another, H or F,
a and b are each, independently of one another, 0 or 1.

The invention further relates to the use of the LC media according to the invention for electro-optical purposes, in particular in bistable displays and CLC displays, such as SSCT and PSCT displays.

The invention further relates to an electro-optical display, in particular a bistable, CLC, SSCT or PSCT display, having two plane-parallel outer plates which, together with a frame, form a cell, and an LC medium located in the cell, where the LC medium is a medium as described above and below.

Surprisingly, it has been found that it is possible to provide an LC medium in accordance with the present invention having a reflection wavelength in the visible region and/or a cholesteric phase at room temperature which has moderate to low birefringence values and nevertheless has sufficiently high values of the dielectric anisotropy Δε in order to achieve low response times. In the LC media according to the invention, this is achieved, in particular, through the use of compounds of the formula I, preferably in combination with compounds of formulae II and III, together with highly twisting chiral dopants as described below.

Thus, the use of the compounds of the formula I, preferably in combination with compounds of formulae II and III in the LC media for CLC displays according to the invention results in high polarity, i.e. low threshold voltages, and a high Δn value, leading to high transmission in the switched state, short response times and a broad operating-temperature range.

In addition, the LC media according to the invention, on use in CLC displays, exhibit excellent properties with respect to color saturation and UV stability through the combination of the compounds of the formulae I, II and III. In particular, this enables the achievement of CLC and SSCT displays which are also able to display the color red without appearing orange through the high yellow and green components of the SSCT displays known to date.

The compounds of formula I are especially useful for realizing an LC medium with a very high positive dielectric anisotropy Δε, and for reducing the threshold voltage of the display, and also for increasing the birefringence of the LC medium and the contrast of the display.

Moreover, the achievement of the high polarity that is necessary for acceptable switching voltages is surprisingly not adversely affected here.

Furthermore, the LC media according to the invention are distinguished by the following advantages:

they have a broad cholesteric phase range, in particular at low temperatures, and a high clearing point,
they have high UV stability.

The compounds of the formulae I, II and III have a broad range of application. Depending on the choice of substituents, these compounds can serve as base materials of which LC media are predominantly composed; however, it is also possible to add compounds of the formulae I, II and III to LC base materials from other classes of compounds in order, for example, to modify the dielectric and/or optical anisotropy of a dielectric of this type and/or to optimize its threshold voltage and/or its viscosity. In the pure state, the compounds of the formulae I, II and III are colorless and form LC mesophases in a temperature range which is favorably located for electro-optical use. They are stable chemically, thermally and to light.

Especially preferred are compounds of formula I wherein L$^1$ and/or L$^2$ is F.

Further preferred are compounds of formula I wherein X$^0$ is fluorinated alkyl or F, in particular F.

The compounds of formula I are preferably selected from the following formulae

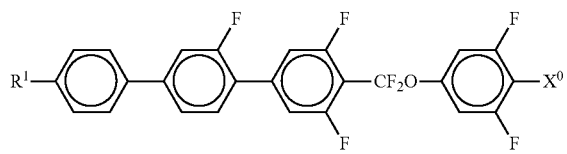

Ia

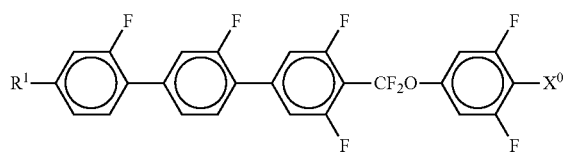

Ib

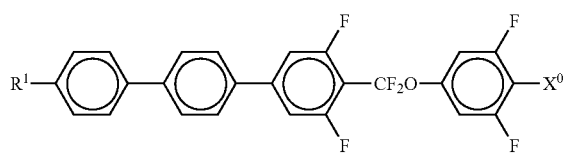

Ic

Id

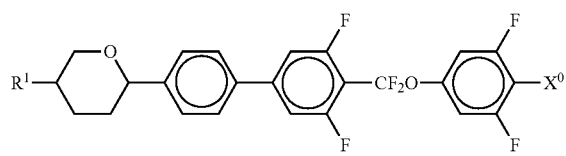

Ie

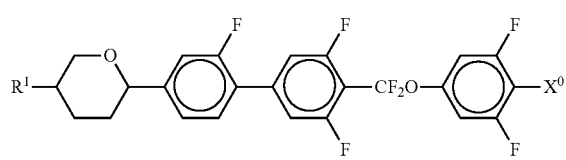

wherein $R^1$ and $X^0$ are as defined in formula I, and $X^0$ is preferably F.

Particular preference is given to compounds of the formula II in which at least one of the radicals $A^1$ and $A^2$ is trans-1,4-cyclohexylene and/or $Z^1$ is —COO—.

The compounds of formula II are preferably selected from the following formulae

IIa

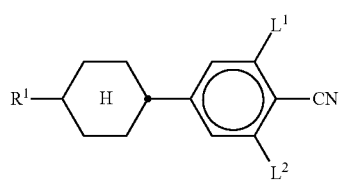

IIb

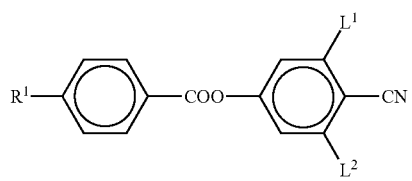

IIc

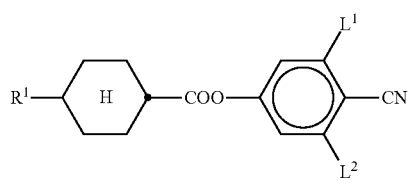

IId

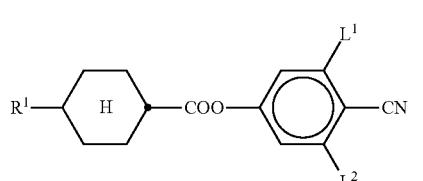

IIe

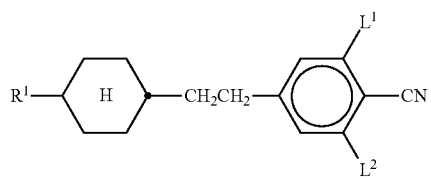

IIf

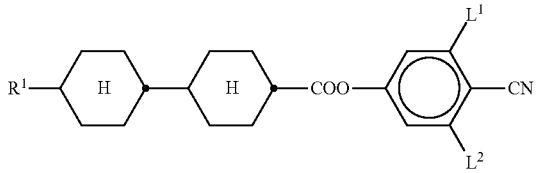

in which $R^1$ is as defined in formula II and $L^1$ and $L^2$ are each, independently of one another, H or F. In these compounds, $R^1$ is particularly preferably alkyl or alkoxy having 1 to 8 carbon atoms.

Particular preference is given to an LC medium wherein the nematic component comprises one or more compounds selected from the group consisting of the formulae IIa, IIb and IIe, in particular those in which $L^1$ and $L^2$ are F, or wherein $L^1$ is F and $L^2$ is H.

Preference is furthermore given to an LC medium wherein the nematic component comprises one or more compounds of formula IIf in which $L^2$ is H and $L^1$ is H or F, in particular F.

Particular preference is given to compounds of the formula II in which one or both of $L^1$ and $L^2$ denote F.

The compounds of formula III are preferably selected from the following formulae IIIa

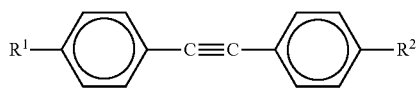

IIIb

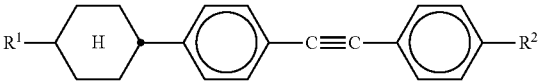

IIIc

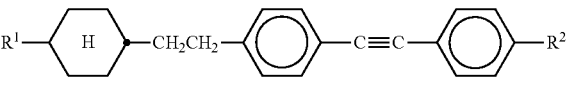

IIId

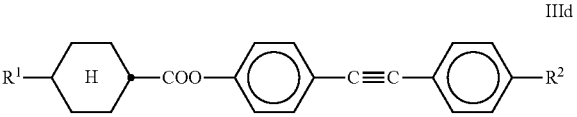

IIIe

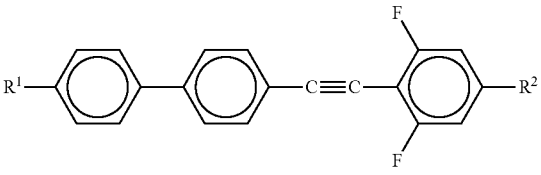

in which $R^1$ and $R^2$ are as defined above. In these compounds, $R^1$ and $R^2$ are particularly preferably alkyl or alkoxy having 1 to 8 carbon atoms.

Particular preference is given to compounds of the formulae IIIa, IIIb and IIIe.

The nematic component of the LC medium according to the present invention preferably comprises, in addition to the compounds of the formulae I, II and III, one or more compounds selected from the group consisting of the bicyclic compounds of the following formulae:

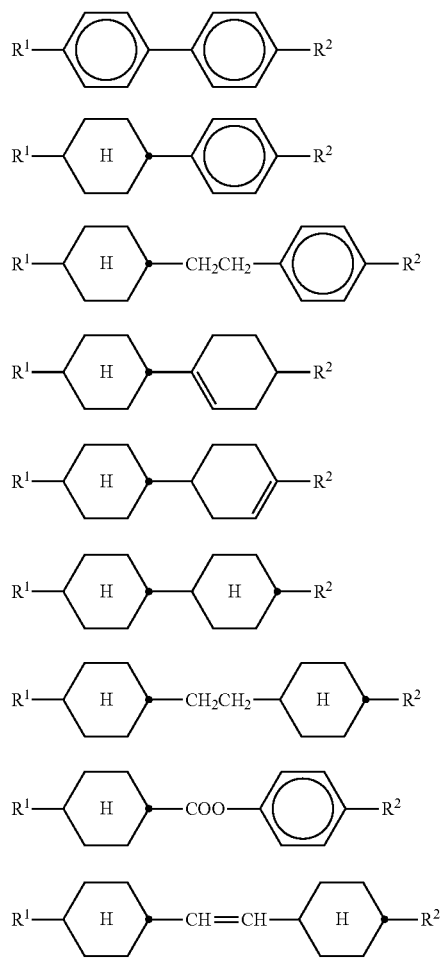
and/or one or more compounds selected from the group consisting of the tricyclic compounds of the following formulae:
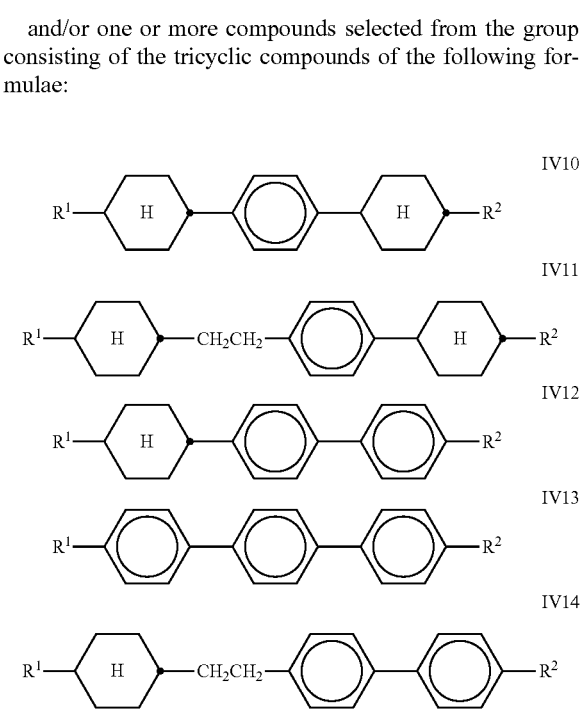
and/or one or more compounds selected from the group consisting of the tetracyclic compounds of the following formulae:

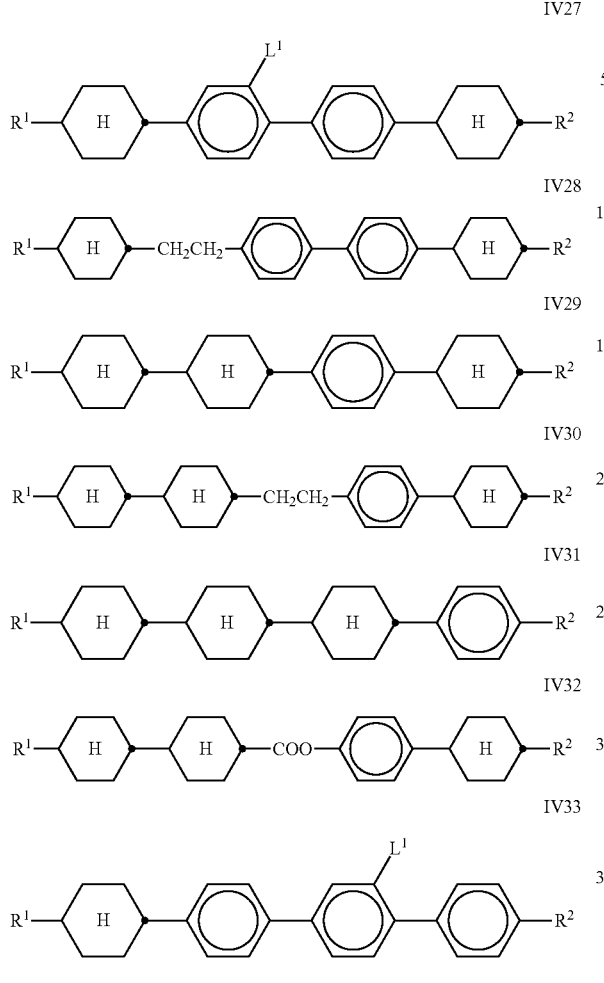

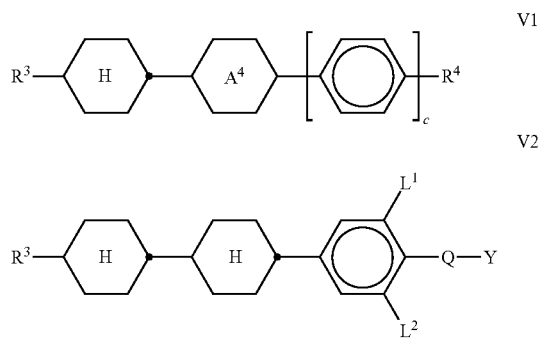

in which
A⁴ is 1,4-phenylene or trans-1,4-cyclohexylene,
c is 0 or 1,
$R^3$ is an alkenyl group having 2 to 7 carbon atoms,
$R^4$ is an alkyl, alkoxy or alkenyl group, in each case having up to 12 carbon atoms, where one or two non-adjacent $CH_2$ groups may also be replaced by —O—, —CH=CH—, —C≡C—, —CO—, —OCO— or —COO— in such a way that oxygen atoms are not linked directly to one another,
Q is $CF_2$, $OCF_2$, CFH, OCFH or a single bond,
Y is F or Cl, and
$L^1$ and $L^2$ are each, independently of one another, H or F.

Particular preference is given to compounds of the formula V1 in which c is 1. Further preferred compounds of the formula V1 are selected from the following formulae

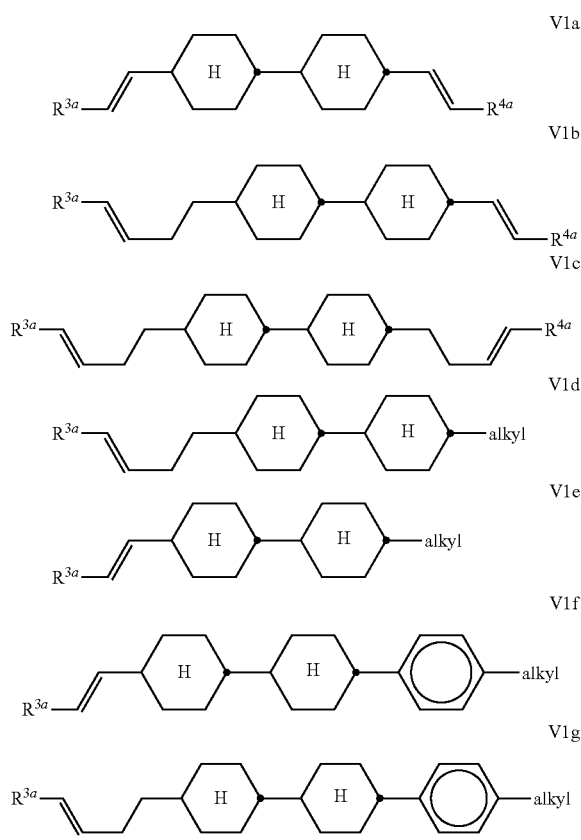

in which $R^1$ and $R^2$ each, independently of one another, have one of the meanings indicated for $R^1$ in the formula I and are preferably each, independently of one another, an alkyl, alkoxy or alkenyl group, which in each case has up to 12 carbon atoms, in which, in addition, one or two non-adjacent $CH_2$ groups may be replaced by —O—, —CH=CH—, —C≡O—, —CO—, —OCO— or —COO— in such a way that O atoms are not linked directly to one another, and $L^1$ is H or F.

The 1,4-phenylene groups in IV10 to IV19 and IV23 to IV26 may each, independently of one another, also be mono- or polysubstituted by fluorine.

Particular preference is given to compounds of the formulae IV27 to IV33 in which $R^1$ is alkyl and $R^2$ is alkyl or alkoxy, each having from 1 to 7 carbon atoms. Preference is furthermore given to compounds of the formulae IV25 and IV31 in which $L^1$ is F. Very particular preference is given to compounds of the formulae IV6, IV26, IV27 and IV32.

$R^1$ and $R^2$ in the compounds of the formulae IV1 to IV33 are particularly preferably straight-chain alkyl or alkoxy having from 1 to 12 carbon atoms.

The nematic component of the LC medium according to the present invention preferably comprise, in addition to the compounds of the formulae I, II and III, one or more alkenyl compounds selected from the formulae V1 and V2

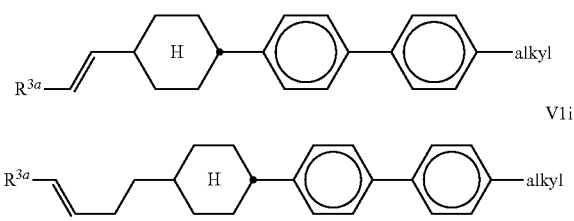

V1h

V1i in which $R^{3a}$ and $R^{4a}$ are each, independently of one another, H, CH$_3$, C$_2$H$_5$ or n-C$_3$H$_7$ and alkyl is an alkyl group having 1 to 8 carbon atoms.

Particular preference is given to compounds of the formula V1a, in particular those in which $R^{3a}$ and $R^{4a}$ are CH$_3$, compounds of the formula V1e, in particular those in which $R^{3a}$ is H, and compounds of the formulae V1f, V1g, V1h and V1i, in particular those in which $R^{3a}$ is H or CH$_3$.

Particularly preferred compounds of the formula V2 are those in which $L^1$ and/or $L^2$ are F and Q-Y is F or OCF$_3$. Further preferred compounds of the formula V2 are those in which $R^3$ is 1E-alkenyl or 3E-alkenyl having 2 to 7 carbon atoms, in particular 2, 3 or 4 carbon atoms. Further preferred compounds of the formula V2 are those of the formula V2a

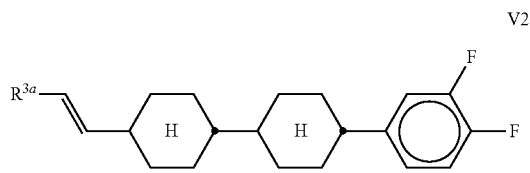

V2a in which $R^{3a}$ is H, CH$_3$, C$_2$H$_5$ or n-C$_3$H$_7$, in particular H or CH$_3$.

The use of compounds of the formula V1 and V2 leads to liquid-crystal mixtures according to the invention having particularly low rotational viscosity values and to CLC displays having fast response times in particular at low temperatures.

In another preferred embodiment, the nematic component of the LC medium according to the present invention comprise, in addition to the compounds of the formulae 1, and optionally II and III, one or more compounds of the formula VI1 and/or VI2

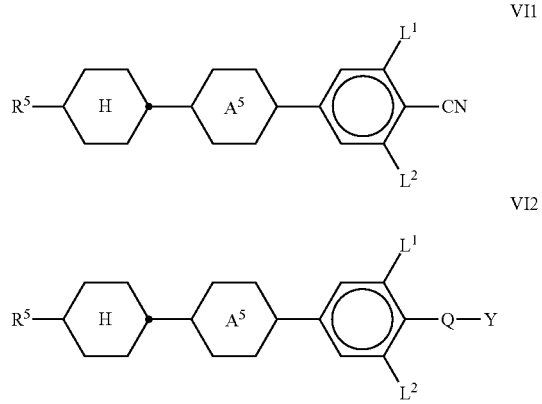

VI1

VI2 in which
$A^5$ is 1,4-phenylene which may also be fluorinated in 3 and/or 5 position, or trans-1,4-cyclohexylene,
$R^5$ is an alkyl, alkoxy or alkenyl group, in each case having up to 12 carbon atoms, where one or two non-adjacent CH$_2$ groups may also be replaced by —O—, —CH=CH—, —C≡C—, —CO—, —OCO— or —COO— in such a way that oxygen atoms are not linked directly to one another,
Q is CF$_2$, OCF$_2$, CFH, OCFH or a single bond,
Y is F or Cl, and
$L^1$ and $L^2$ are each, independently of one another, H or F.

Particular preference is given to compounds of the formulae VI1 and VI2 in which $A^5$ is 1,4-phenylene.

Further preferred compounds of the formulae VI1 and VI2 are selected from the following formulae

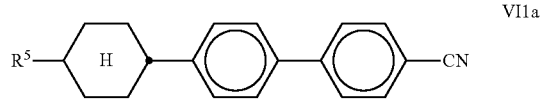

VI1a

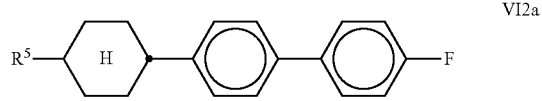

VI2a

VI2b

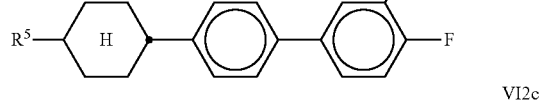

VI2c

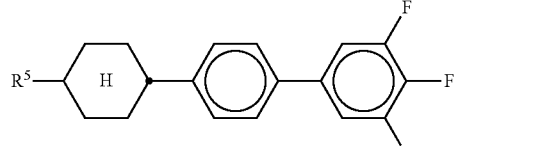

in which $R^5$ is as defined in formula VI1 above and is preferably alkyl or alkoxy having 1 to 8 carbon atoms.

Particular preference is given to compounds of the formulae VI1a and VI2b.

The compounds of the formulae VI1 and VI2 lead inter alia to an increase in birefringence in the media according to the invention. Especially the compounds of the formula VI2 increase the birefringence while maintaining a low viscosity.

Further preferably the nematic component of the LC medium additionally comprises one or more compounds of formula D

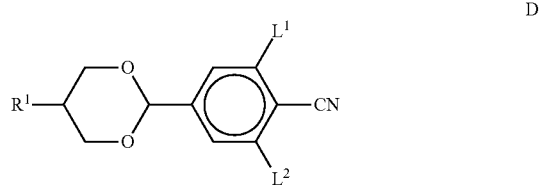

D wherein $R^1$, $L^1$ and $L^2$ have the meanings given in formula I.

The compounds of formula D are preferably selected from the following formulae:

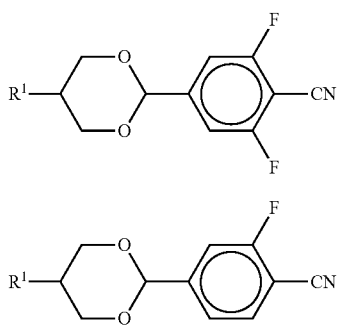

in which $R^1$ is as defined in formula I and is particularly preferably n-alkyl having from 1 to 8 carbon atoms or alkenyl having from 2 to 7 carbon atoms. Particular preference is given to compounds of the formula Da.

Further particularly preferred embodiments relate to an LC medium wherein the nematic component comprises one or more of the following, including any combination thereof
one, two or three compounds of formula I,
one or more compounds of formula Ia in which $X^0$ is F,
one or more compounds of formula Ic in which $X^0$ is F,
one or more compounds of formula IIb in which $L^1$ is F and $L^2$ is H,
one or more compounds of formula IIe in which $L^1$ is F and $L^2$ is H,
one or more compounds of formula IIIa and/or IIIe,
one or more compounds of formula Da,
from 1 to 35%, very preferably from 3 to 25%, of one or more compounds of formula I, very preferably of formula Ia, Ib or Ic,
more than 30%, preferably more than 40%, very preferably more than 50%, of one or more compounds of formula II,
from 8 to 65%, preferably from 15 to 55%, of one or more compounds of formula IIb,
from 3 to 45%, preferably from 5 to 30%, of one or more compounds of formula IIe,
from 5 to 60%, preferably from 10 to 50%, of one or more compounds of formula III, very preferably of formula IIIa and/or IIIe,
from 1 to 25%, preferably from 2 to 15%, of one or more compounds of formula D, very preferably of formula Da.

In a further particularly preferred embodiment, the nematic component essentially consists of compounds selected from the group consisting of the formulae I, II, III and D, and very preferably contains at least one compound of each of formulae I, II, III and D.

Through a suitable choice of the terminal radicals $R^{1-5}$ and Q-Y in the compounds of the formulae I to VI and D, the addressing times, the threshold voltage and further properties can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $K_3$ (bend) and $K_1$ (splay) compared with alkyl or alkoxy radicals. 4-Alkenyl radicals, 3-alkenyl radicals and the like generally give lower threshold voltages and smaller values of $K_3/K_1$ compared with alkyl and alkoxy radicals.

A —$CH_2CH_2$— group in the bridging members $Z^1$, $Z^2$ and $Z^3$ generally results in higher values of the ratio of the elastic constants $K_3/K_1$ compared with a single covalent bond. Higher values of $K_3/K_1$ facilitate, for example, a shorter reflection wavelength without a change in the dopant concentration owing to the higher HTP.

The optimum mixing ratio of the individual compounds of the formulae I to VI and D depends substantially on the desired properties, on the choice of the compounds of the formulae I to VI and D and on the choice of further components optionally present. Suitable mixing ratios within the above-mentioned range can easily be determined from case to case.

In the formulae mentioned above and below, the term "fluorinated alkyl or alkoxy having from 1 to 3 carbon atoms" preferably denotes $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$.

The term "alkyl" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Halogen is preferably F or Cl, in particular F.

If one of the above-mentioned radicals is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl(=methoxymethyl), 2-(=ethoxymethyl) or 3-oxabutyl(=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If one of the above-mentioned radicals is an alkyl radical in which one $CH_2$ group has been replaced by —CH=CH—, this may be straight-chain or branched. It is preferably straight-chain and has from 2 to 10 carbon atoms, Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6-or -7-enyl, non-1-, -2-, -3-, -4-, -5-, -6-, -7- or -8-enyl, or dec-1-, -2-, -3-, -4-, -5-, -6-, -7-, -8- or -9-enyl.

If one of the above-mentioned radicals is an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms.

Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If one of the above-mentioned radicals is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 13 carbon atoms. Accordingly, it is in particular acryloyloxymethyl, 2-acryloyloxyethyl, 3-acryloyloxypropyl, 4-a cryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-meth acryloyloxyhexyl, 7-methacryloyloxyheptyl, 8-methacryloyloxyoctyl or 9-methacryloyloxynonyl.

If one of the above-mentioned radicals is an alkyl or alkenyl radical which is monosubstituted by CN or $CF_3$, this radical is preferably straight-chain. The substitution by CN or $CF_3$ is in any desired position.

If one of the above-mentioned radicals is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the co-position.

Compounds containing branched wing groups may occasionally be of importance owing to better solubility in the conventional liquid-crystalline base materials. However, they may in particular be suitable as chiral dopants if they are optically active.

Branched groups of this type generally contain not more than one chain branch. Preferred branched radicals are isopropyl, 2-butyl(=1-methylpropyl), isobutyl(=2-methylpropyl), 2-methylbutyl, isopentyl(=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If one of the above-mentioned radicals is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5, 5-bis(methoxycarbonyl)pentyl, 6,6-bis(methoxycarbonyl)hexyl, 7,7-bis(methoxycarbonyl)heptyl, 8, 8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

The optically active component of the CLC media according to the invention comprises one or more chiral dopants whose helical twisting power and concentration are selected in such a way that the helix pitch of the LC medium is less than or equal to 1 µm.

The proportion of optically active component in the CLC media according to the invention is preferably ≦20%, in particular ≦10%, particularly preferably from 0.01 to 7%, very particularly preferably from 0.1 to 5%. The optically active component preferably comprises from 1 to 6, in particular 1, 2, 3 or 4, chiral dopants.

The chiral dopants should preferably have a high helical twisting power (HTP) and low temperature dependence. They should furthermore have good solubility in the nematic component and not impair the liquid-crystalline properties of the LC medium, or only do so to a small extent. They can have the same or opposite directions of rotation and the same or opposite temperature dependence of the twist.

Particular preference is given to chiral dopants having an HTP of 20 µm$^{-1}$ or more, in particular 40 µm$^{-1}$ or more, particularly preferably 70 µm$^{-1}$ or more.

For the optically active component, a multiplicity of chiral dopants, some of which are commercially available, is available to the person skilled in the art, such as, for example, cholesteryl nonanoate, RIS-811, RIS-1011, R/S-2011, RIS-3011 or CB15 (available from Merck KGaA, Darmstadt).

Particularly suitable dopants are compounds which contain one or more chiral radicals and one or more mesogenic groups or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore monovalent or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide(1,4:3,6-dianhydro-D-sorbide and isosorbide), dianhydromannitol(isosorbitol) or dianhydroiditol(isoiditol); sugar acids, such as, for example, gluconic acid, gulonic acid and ketogulonic acid; chiral substituted glycol radicals, such as, for example, mono- or oligoethylene or -propylene glycols in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE-A-43 42 280, EP-A-1 038 941 and DE-A-195 41 820.

Particular preference is given to chiral dopants selected from the group comprising compounds of the following formulae:

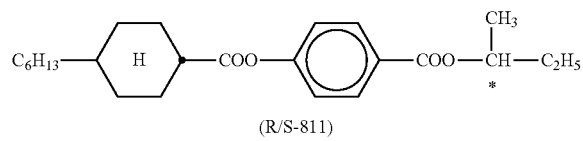

(R/S-811)

VII

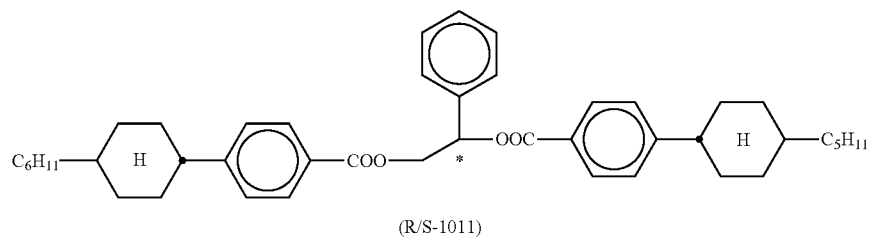

(R/S-1011)

VIII

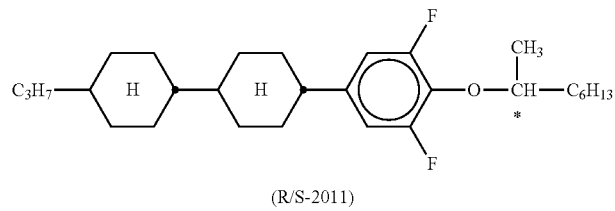

(R/S-2011)

IX

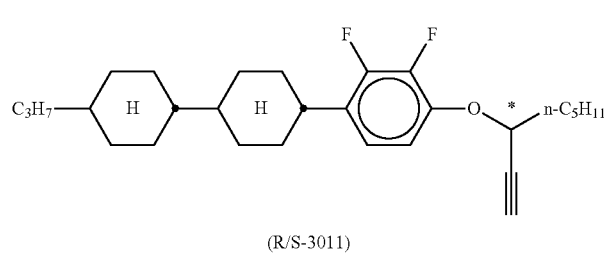

(R/S-3011)

X

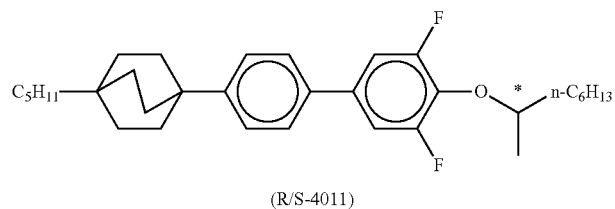

(R/S-4011)

XI

Further preferred chiral dopants are derivatives of isosorbide, isomannitol or isoiditol of the following formula:

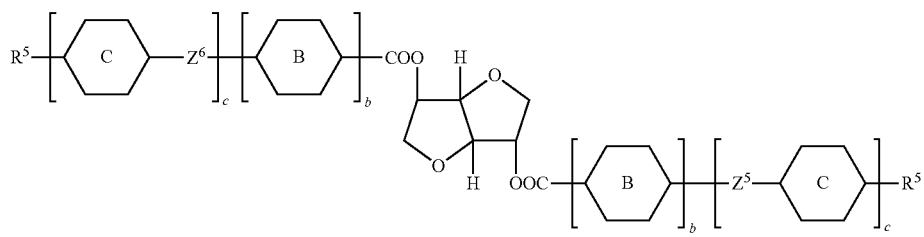

XII in which the group

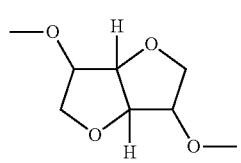

(dianhydrosorbitol),

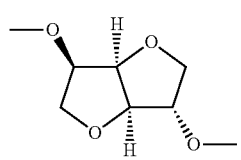

(dianhydromannitol), or

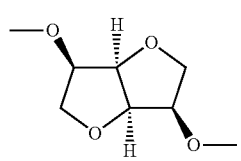

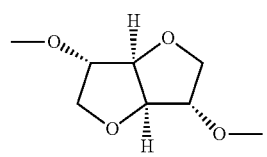

(dianhydroiditol),
and is preferably dianhydrosorbitol,
and chiral ethanediols, such as, for example, diphenylethanediol(hydrobenzoin), in particular mesogenic hydrobenzoin derivatives of the formula

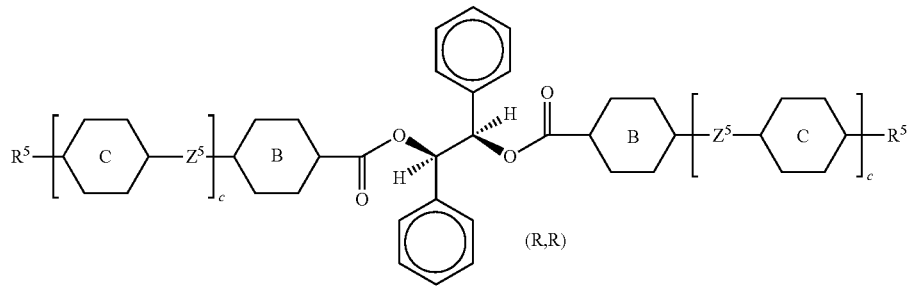

XIII including the (R,S), (S,R), (R,R) and (S,S) enantiomers that not are shown,
in which
B and C are each, independently of one another, 1,4-phenylene, which may also be monosubstituted, disubstituted or trisubstituted by L, or 1,4-cyclohexylene,
L is H, F, Cl, CN or optionally halogenated alkyl, alkoxy, alkylcarbonyl, alkoxycarbonyl, alkoxycarbonyloxy or alkoxycarbonyloxy, which in each case have up to 7 carbon atoms,
b is 0, 1 or 2,
c is 0 or 1,
$Z^5$ is —COO—, —OCO—, —CH$_2$CH$_2$— or a single bond, and
$R^5$ is alkyl, alkoxy, alkylcarbonyl, alkoxycarbonyl or alkylcarbonyloxy, which in each case have up to 12 carbon atoms.

The compounds of formula XII are described in WO 98/00428. The compounds of formula XIII are described in GB-A-2 328 207. The disclosures of WO 98/00428 and GB-A-2 328 207 are hereby incorporated by reference.

Very particularly preferred dopants are chiral binaphthyl derivatives, as described in WO 02/94805, chiral binaphthol acetal derivatives, as described in WO 02/34739, chiral TAD- DOL derivatives, as described in WO 02/06265, and chiral dopants containing at least one fluorinated bridging group and a terminal or central chiral group, as described in WO 02/06196 and WO 02/06195. The disclosures of WO 02/94805, WO 02/34739, WO 02/06265, WO 02/06196, and WO 02/06195 are hereby incorporated by reference.

Particular preference is given to chiral binaphthyl derivatives of the following formula,

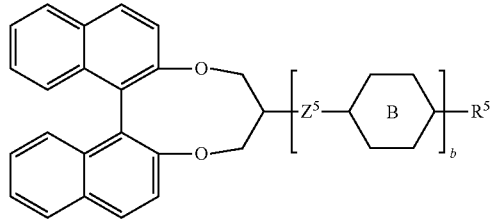

XIV in which B, b, $R^5$ and $Z^5$ are as defined in formula XII, and $Z^5$ is, in particular, —OCO— or a single bond, in particular those selected from the following formulae:

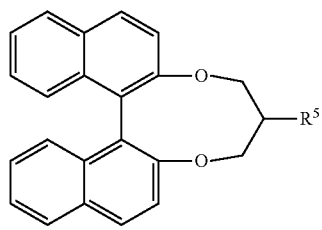

XIVa

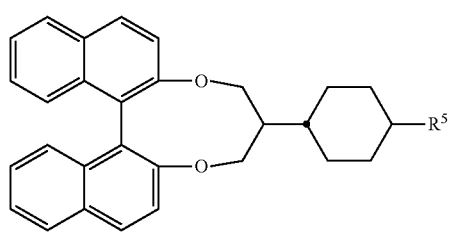

XIVb

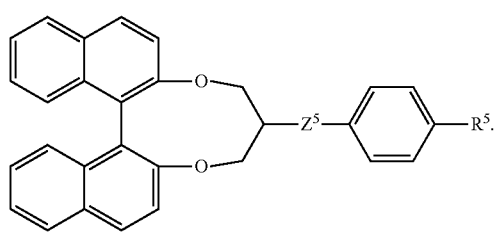

XIVc

The dopants of the following formula:

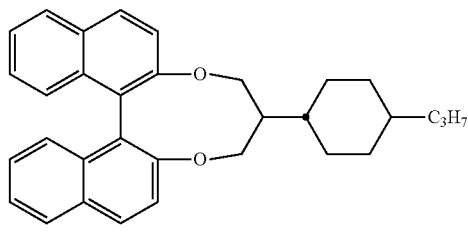

XIVb1

(R/S-5011)

are particularly preferred.

In particularly preferred embodiments, the optically active component of the media according to the invention comprises one of the following
- one or more dopants selected from the formulae VII to XIII, and/or
- one or more dopants of formula XIV, and/or
- not more than one dopant, preferably selected from formula XIV, preferably in a proportion of less than 8%, in particular less than 5%, of the mixture as a whole (i.e. the sum of the proportions by weight of the nematic and optically active components).

In a further particularly preferred embodiment, the media according to the invention comprise 10% or less, in particular from 0.01 to 5%, of the optically active component.

In particular, the chiral dopants of the above-mentioned formulae XII, XIII and XIV have good solubility in the nematic component and induce a cholesteric structure having high twist and low temperature dependence of the helix pitch and reflection wavelength. Even on use of only one of these dopants in small amounts, it is possible to achieve CLC media according to the invention having reflection colors in the visible wavelength range of high brightness and low temperature dependence which are suitable, in particular, for use in SSCT and PSCT displays.

This is an important advantage over the CLC media from the prior art, in which at least two dopants having the same direction of rotation and opposite temperature dependence of the twist are usually required (for example one dopant having positive temperature dependence, i.e. an increase in twist with increasing temperature, and one dopant having negative temperature dependence) in order to achieve temperature compensation of the reflection wavelength. In addition, large amounts of dopants are frequently required in the known CLC media in order to achieve reflection in the visible region.

A particularly preferred embodiment of the invention therefore relates to a CLC medium and to a CLC display containing this medium, as described above and below, in which the chiral component comprises only one chiral compound, preferably in an amount of less than 10%, in particular less than 7%. The chiral compound in these media is particularly preferably selected from the compounds described in WO 02/94805, WO 02/34739, WO 02/06265, WO 02/06196 and WO 02/06195 and from the formulae VII to XIV, including preferred sub-formulae thereof. A CLC medium of this preferred embodiment has low dependence of the reflection wavelength λ, on the temperature T over a broad temperature range.

The helix pitch of the medium is preferably from 130 nm to 1000 nm, in particular from 200 nm to 750 nm, particularly preferably from 300 nm to 450 nm.

The helix pitch is preferably selected in such a way that the medium reflects light in the visible wavelength range. The term "visible wavelength range" or "visible spectrum" typically covers the wavelength range from 400 to 800 nm. Above and below, however, this term is also intended to cover the wavelength range from 200 to 1200 nm, including the UV and infrared (IR) range, and the far UV and far IR range.

The reflection wavelength of the LC medium according to the invention is preferably in the range from 200 to 1500 nm, in particular from 300 to 1200 nm, particularly preferably from 350 to 900 nm, very particularly preferably from 400 to 800 nm. Preference is furthermore given to LC media having a reflection wavelength of from 400 to 700 nm, in particular from 400 to 600 nm.

The wavelength values indicated above and below relate to the half-value width of the reflection band, unless stated otherwise.

Particular preference is given to CLC media according to the invention having a temperature dependence $d\lambda/dT$ of 0.6 nm/° C. or less, in particular 0.3 nm/° C. or less, very particularly preferably 0.15 nm/° C. or less, preferably in the range between 0 and 50° C., in particular between −20 and 60° C., particularly preferably between −20 and 70° C., very particularly preferably in the range from −20° C. to a temperature of 10° C., in particular 5° C., below the clearing point.

Unless stated otherwise, $d\lambda/dT$ denotes the local gradient of the function $\lambda(T)$, where a nonlinear function $\lambda(T)$ is described to an approximation by a 2nd or 3rd order polynomial.

The invention furthermore relates to the use of the CLC media according to the invention for electro-optical purposes.

The invention furthermore also relates to an electro-optical display containing CLC media according to the invention, in particular an SSCT or PSCT display having two plane-parallel outer plates which, together with a frame, form a cell, and a cholesteric liquid-crystal mixture located in the cell.

The invention furthermore relates to an electro-optical active-matrix display containing CLC media according to the invention, in particular an AM-CLC display, preferably an AM-SSCT or PSCT display, having two plane-parallel outer plates which, together with a frame, form a cell, integrated non-linear elements for switching individual pixels on the outer plates, and a cholesteric liquid-crystal mixture, which preferably has positive dielectric anisotropy and a high specific resistance, located in the cell.

The construction of bistable SSCT and PSCT cells is described, for example, in WO 92/19695, WO 93/23496, U.S. Pat. Nos. 5,453,863 or 5,493,430. The construction of active-matrix CLC displays is described, for example, in WO 02/086855 and US 2002-0149552. The disclosures of WO 92/19695, WO 93/23496, U.S. Pat. Nos. 5,453,863, 5,493, 430, WO 02/086855, and US 2002-0149552 are hereby incorporated by reference.

The ratio dip between the layer thickness of the liquid-crystal cell d (separation of the outer plates) in a CLC display according to the invention and the natural helix pitch p of the CLC medium is preferably greater than 1, in particular in the range from 2 to 20, particularly preferably from 3 to 15, very particularly preferably from 4 to 10.

The CLC media according to the invention facilitate a significant broadening of the available parameter latitude. Thus, the achievable combinations of reflection wavelength, birefringence, clearing point, viscosity, thermal and UV stability and dielectric anisotropy far exceed previous materials from the prior art and make the media according to the invention particularly suitable for use in CLC displays.

The CLC media according to the invention preferably have a cholesteric phase down to −20° C. and preferably down to −30° C., very preferably down to −40° C., and a clearing point of at least 70° C., preferably at least 75° C., very preferably at least 80° C.

The dielectric anisotropy $\Delta\epsilon$ of the CLC medium is preferably $\geq 10$, very preferably $\geq 20$, most preferably $\geq 35$.

The birefringence $\Delta n$ of the CLC medium is preferably $\geq 0.15$, very preferably $\geq 0.20$.

At the same time, the CLC media according to the invention have low values for the viscosity and high values for the specific resistance, enabling excellent CLC displays, in particular AM-CLC displays, to be achieved. In particular, the mixtures are characterized by low operating voltages.

It goes without saying that a suitable choice of the components of the mixtures according to the invention also enables higher clearing points (for example above 120° C.) to be achieved at higher threshold voltages or lower clearing points to be achieved at lower threshold voltages while retaining the other advantageous properties. Mixtures having greater $\Delta\epsilon$ and thus lower thresholds can likewise be obtained with viscosities correspondingly increased only slightly.

The width of the cholesteric phase range is preferably at least 90° C., in particular at least 100° C. This range preferably extends at least from −20° to +60° C., particularly preferably at least from −20° to +70° C., very particularly preferably at least from −20° to +80° C.

The UV stability of the CLC media according to the invention is also considerably better, i.e. they exhibit a significantly smaller change in the reflection wavelength and operating voltage on UV exposure.

A further preferred embodiment of the present invention relates to a CLC medium according to the invention which comprises one or more compounds containing at least one polymerizable group. CLC media of this type are particularly suitable for use, for example, in polymer gel or PSCT displays. The polymerizable compounds may be a constituent of the nematic and/or chiral component or form an additional component of the medium.

Suitable polymerizable compounds are known to the person skilled in the art and are described in the prior art. The polymerizable compounds may additionally also be mesogenic or liquid-crystalline. They may contain one or more, preferably two, polymerizable groups. Typical examples of non-mesogenic compounds containing two polymerizable groups are alkyl di-acrylates or alkyl dimethacrylates containing alkyl groups having from 1 to 20 carbon atoms. Typical examples of non-mesogenic compounds containing more than two polymerizable groups are trimethylolpropane trimethacrylate and pentaerythritol tetraacrylate. Typical examples of mesogenic or liquid-crystalline polymerizable compounds (also known as "reactive mesogens" or "RMs") are described, for example, in WO 93/22397, EP 0 261 712, DE 195 04 224, WO 95/22586, WO 97/00600, U.S. Pat. Nos. 5,518,652, 5,750,051, 5,770,107 and 6,514,578. The disclosures of WO 93/22397, EP 0 261 712, DE 195 04 224, WO 95/22586, WO 97/00600, U.S. Pat. Nos. 5,518,652, 5,750,051, 5,770,107 and 6,514,578 are hereby incorporated by reference. Examples of particularly suitable and preferred RMs are shown in the following list.

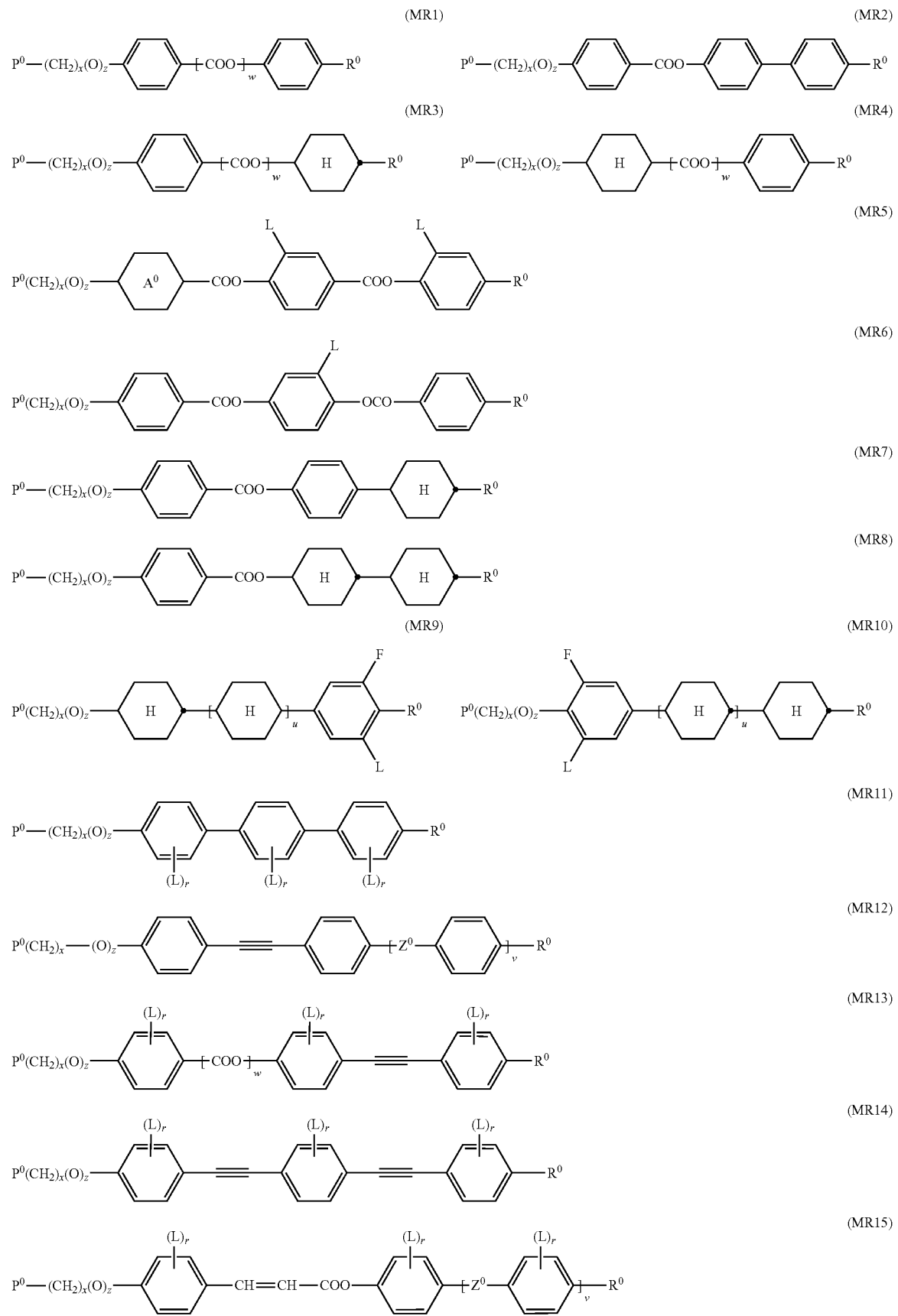

-continued
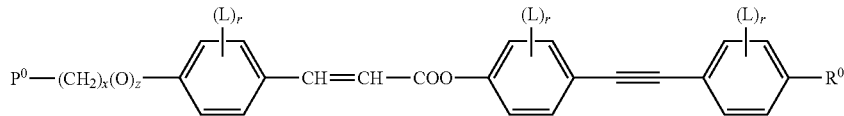  (MR16)
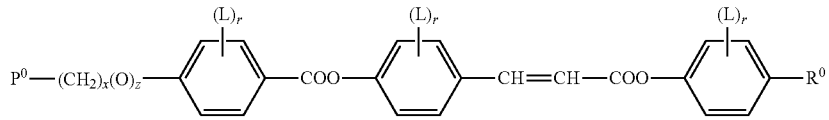  (MR17)
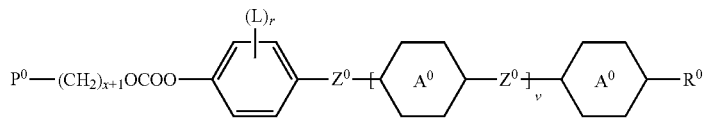  (MR18)
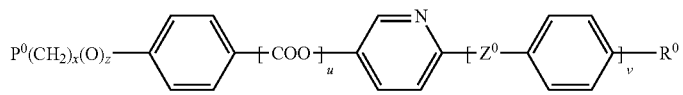  (MR19)
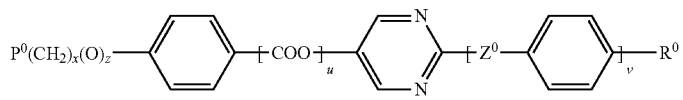  (MR20)
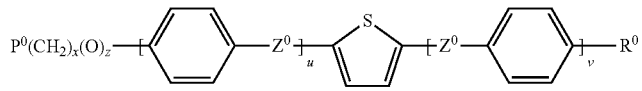  (MR21)
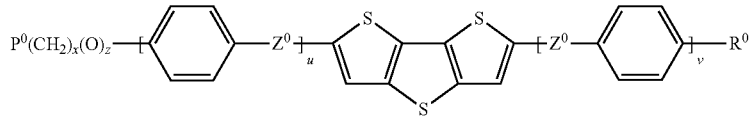  (MR22)
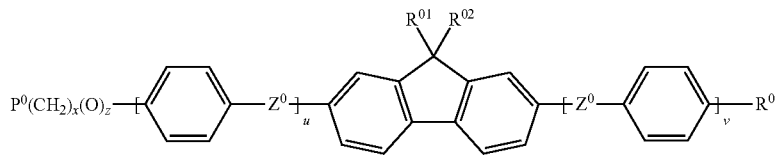  (MR23)
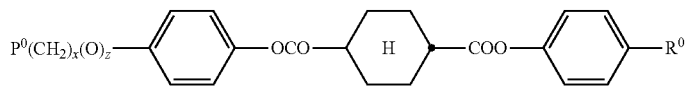  (MR24)
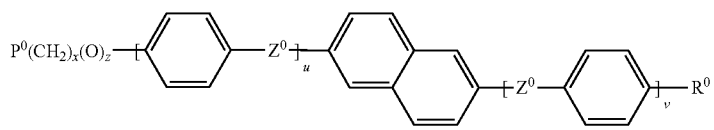  (MR25)
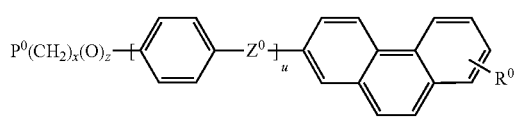  (MR26)     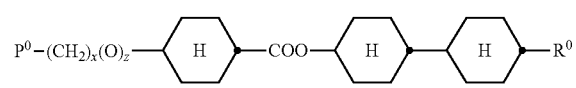  (MR27)
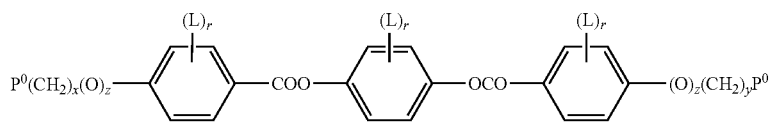  (DR1)

-continued
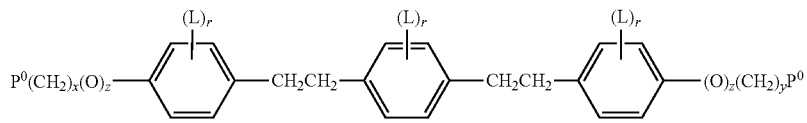 (DR2)
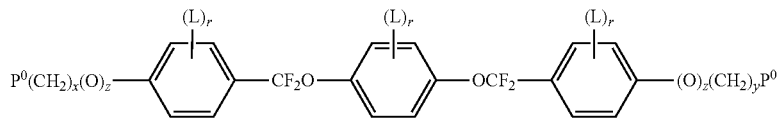 (DR3)
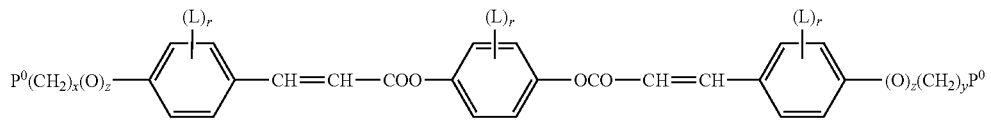 (DR4)
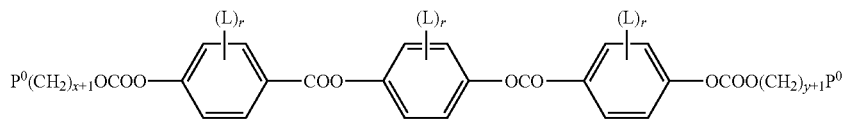 (DR5)
 (DR6)
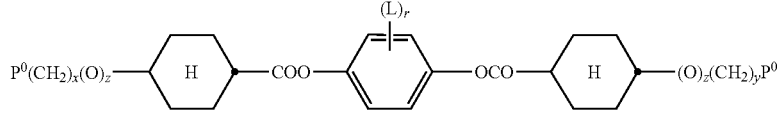 (DR7)
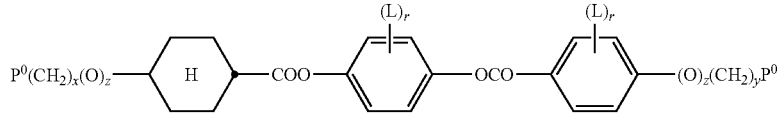 (DR8)
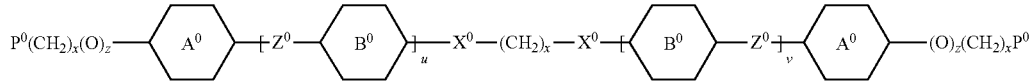 (DR9)
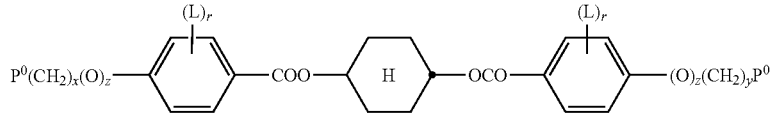 (DR10)
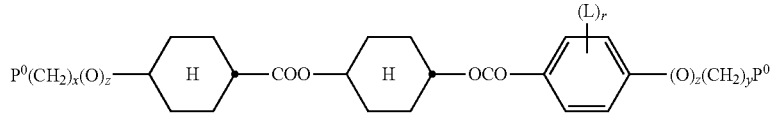 (DR11)
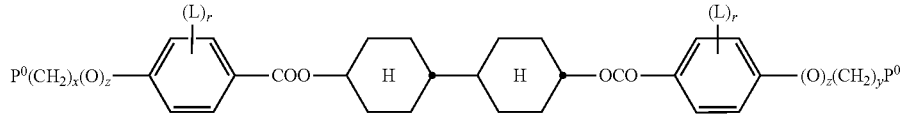 (DR12)
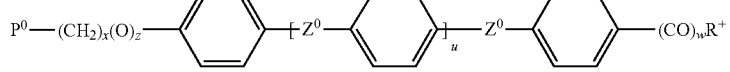 (CR1)
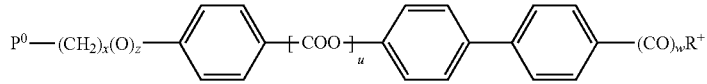 (CR2)

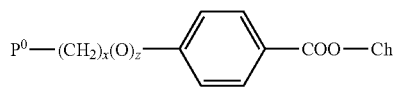 (CR3)

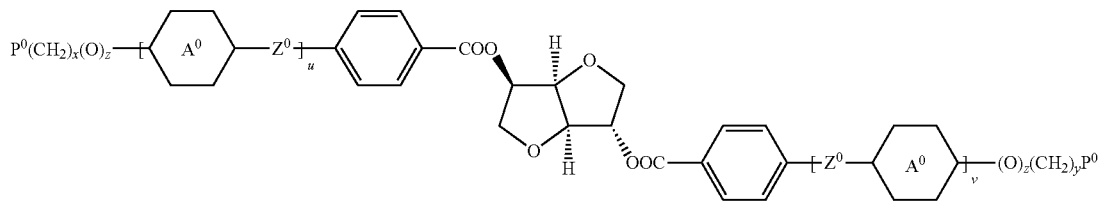 (CR4)

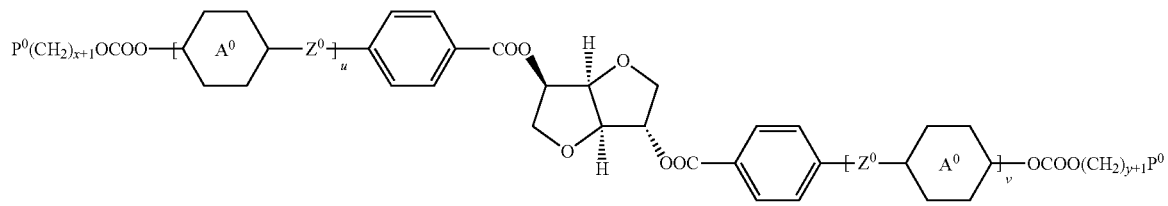 (CR5)

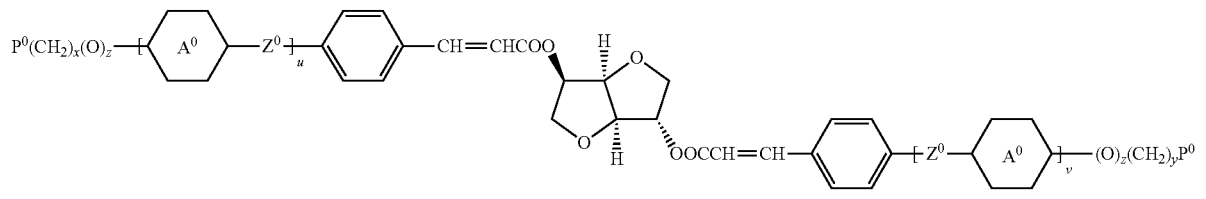 (CR6)

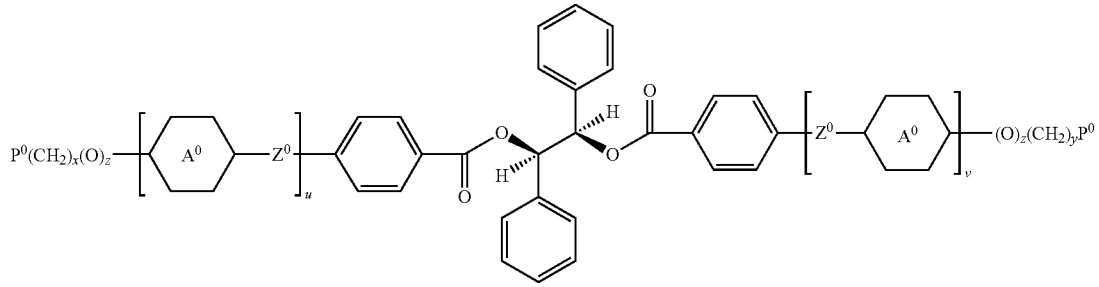 (CR7)

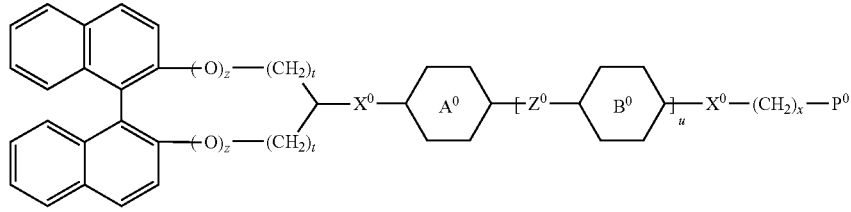 (CR8)

wherein $P^0$ is, in case of multiple occurrence independently of one another, a polymerizable group, preferably an acryl, methacryl, oxetane, epoxy, vinyl, vinyloxy, propenyl ether or styrene group, $A^0$ and $B^0$ are, in case of multiple occurrence independently of one another, 1,4-phenylene that is optionally substituted with 1, 2, 3 or 4 groups L, or trans-1,4-cyclohexylene, $Z^0$ is, in case of multiple occurrence independently of one another, —COO—, —OCO—, —CH$_2$CH$_2$—, —C≡C—, —CH═CH—, —CH═CH—COO—, —OCO—CH═CH— or a single bond, $R^0$ is alkyl, alkoxy, thioalkyl, alkylcarbonyl, alkoxycarbonyl, alkylcarbonyloxy or alkoxycarbonyloxy, in each case having up to 15 C atoms which is optionally fluorinated, or is $Y^0$ or P—(CH$_2$)$_y$—(O)$_z$—, $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $R^{01,02}$ are independently of each other H, $R^0$ or $Y^0$, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy, in each case having up to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, and wherein the benzene and naphthalene rings can additionally be substituted with one or more identical or different groups L.

The CLC medium comprising one or more polymerizable compounds may additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

Besides the compounds of the formulae I to XIV, the CLC media may comprise one or more further components for the purposes of optimization of various properties.

The individual compounds of the formulae above and below and the sub-formulae thereof which can be used in the media according to the invention are either known or they can be prepared analogously to the known compounds.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation.

The liquid-crystal mixtures according to the invention may also comprise further additives, such as, for example, one or more stabilizers or antioxidants or nanoparticles.

The entire disclosure[s] of all applications, patents and publications, cited herein and of corresponding European Application No. 10 006 620.8, filed Jun. 25, 2010 are incorporated by reference herein.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF3/ nOT | $C_nH_{2n+1}$ | $OCF_3$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

Preferred mixture components are shown in Tables A, B and C.

TABLE A

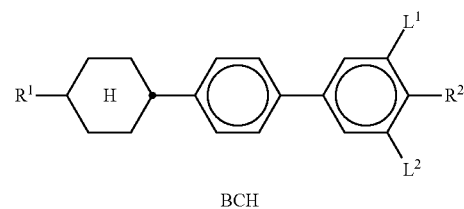

BCH

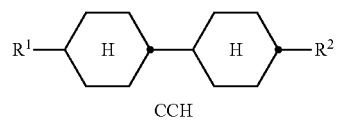

CCH

TABLE A-continued
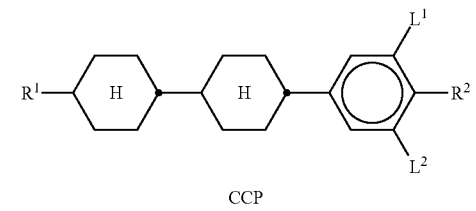
CCP
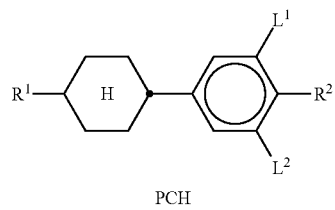
PCH
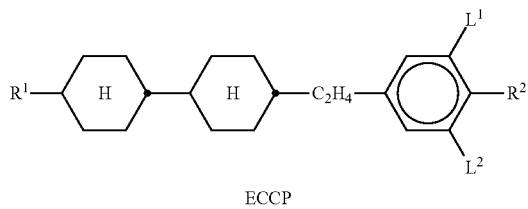
ECCP
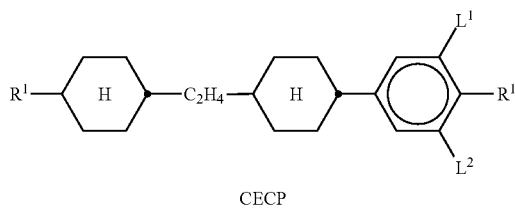
CECP
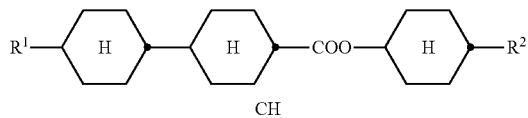
CH
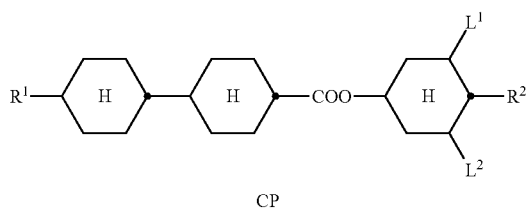
CP
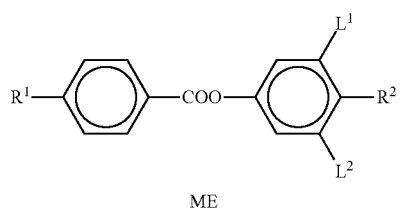
ME
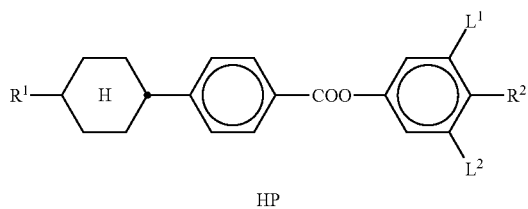
HP TABLE A-continued
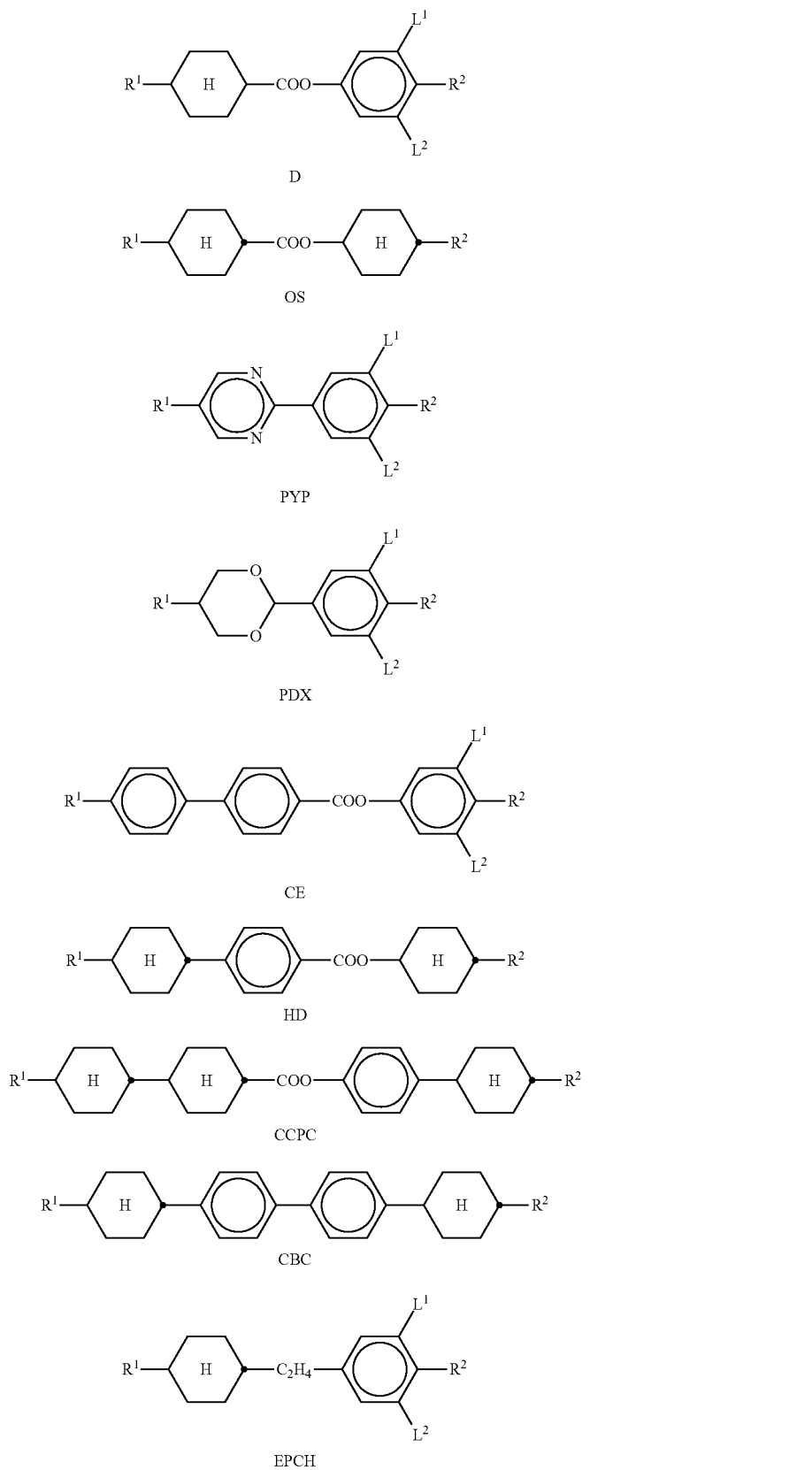

TABLE A-continued
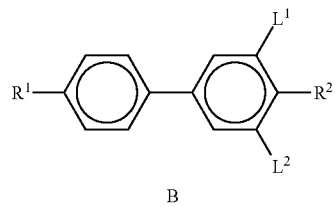
B
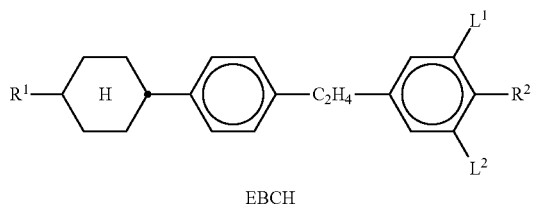
EBCH
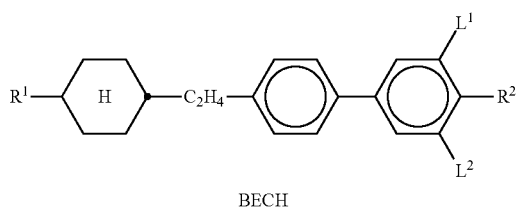
BECH
CPC
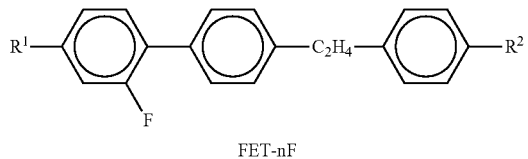
FET-nF
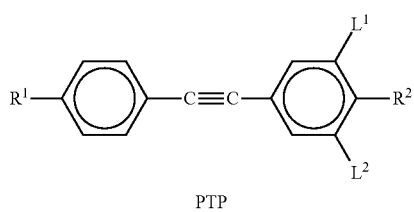
PTP
($L^1$, $L^2$, $L^3$ = H or F)

TABLE B
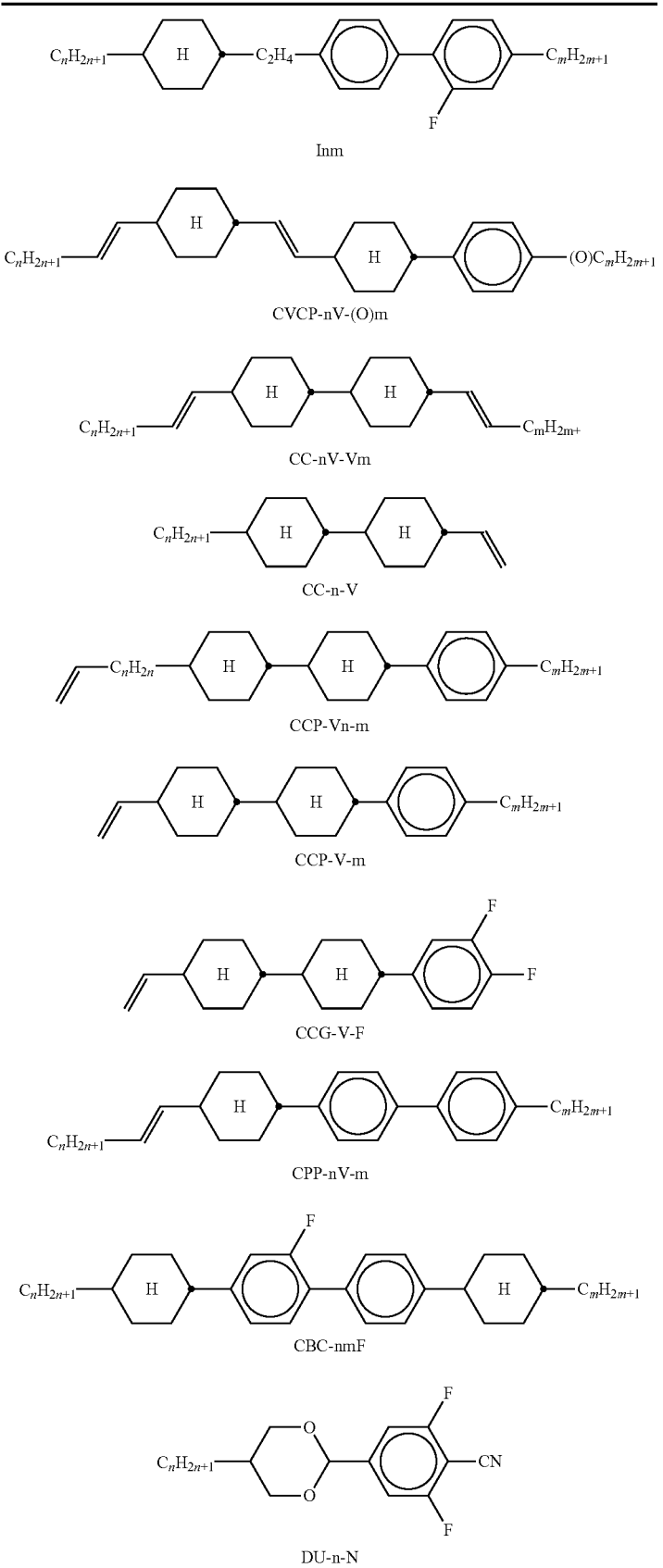

TABLE B-continued
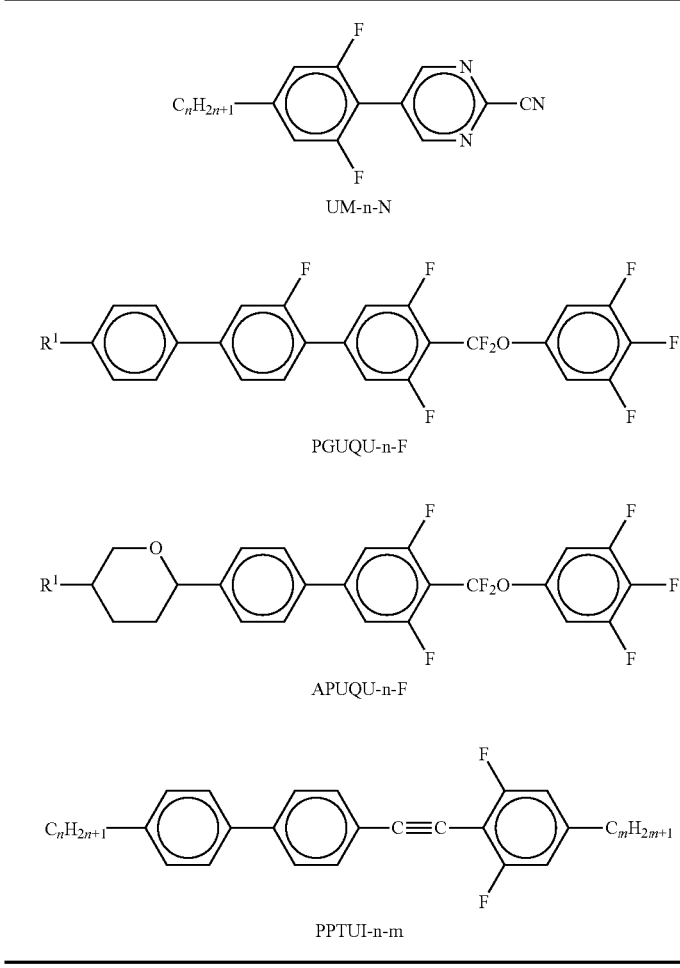
TABLE C
(chiral dopants):
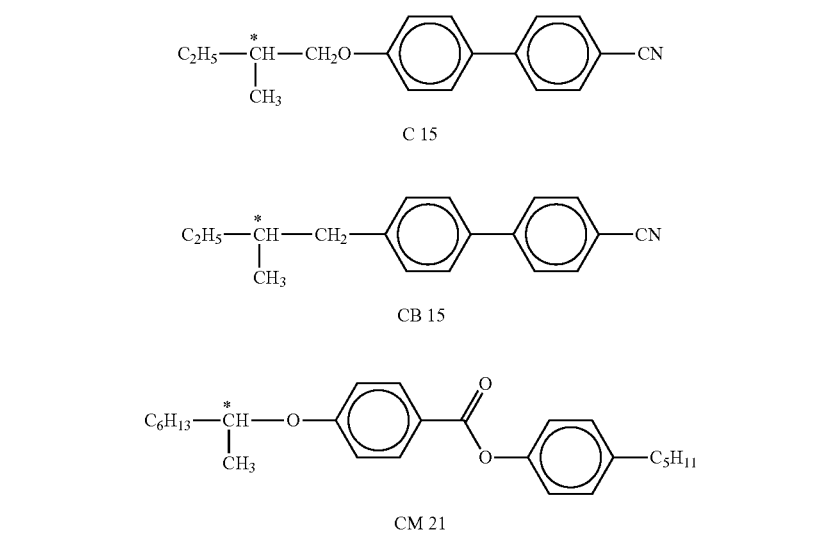

TABLE C-continued
(chiral dopants):
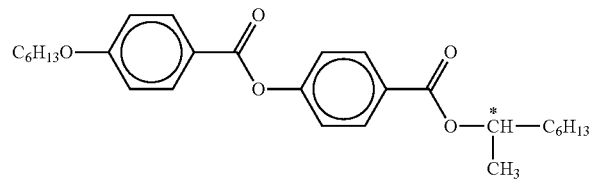
CM 33
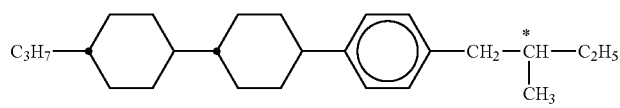
CM 44
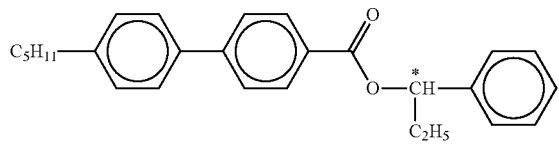
CM 45
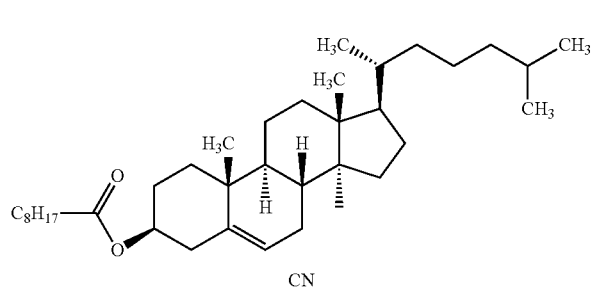
CN
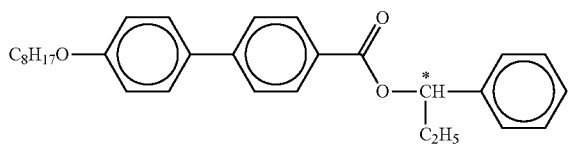
CM 47
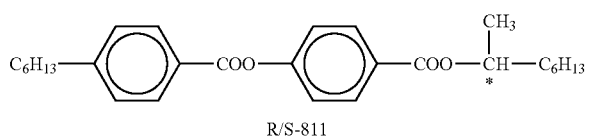
R/S-811
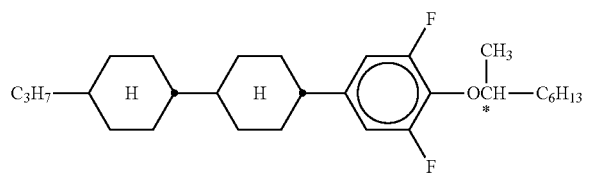
R/S-2011

TABLE C-continued
(chiral dopants):
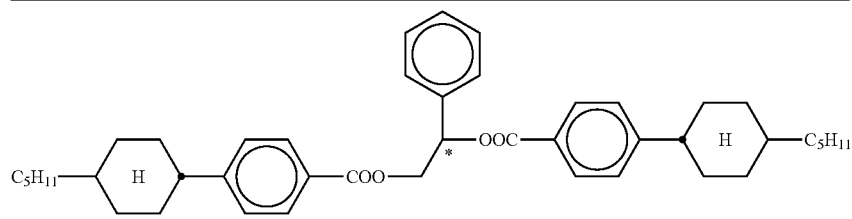
R/S-1011
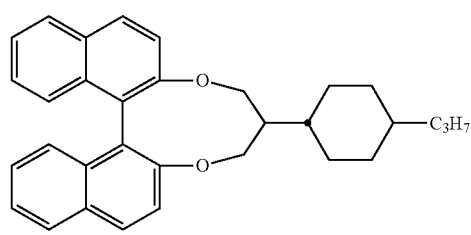
R/S-5011
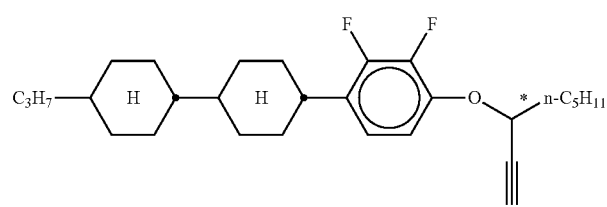
R/S-3011
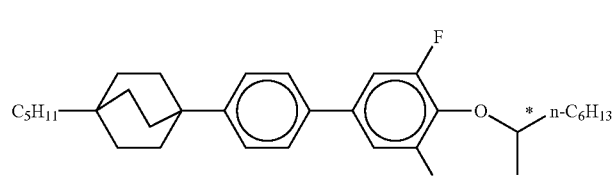
R/S-4011
TABLE D
Suitable stabilizers and antioxidants for LC mixtures are mentioned below
(n = 0-10, terminal methyl groups are not shown):
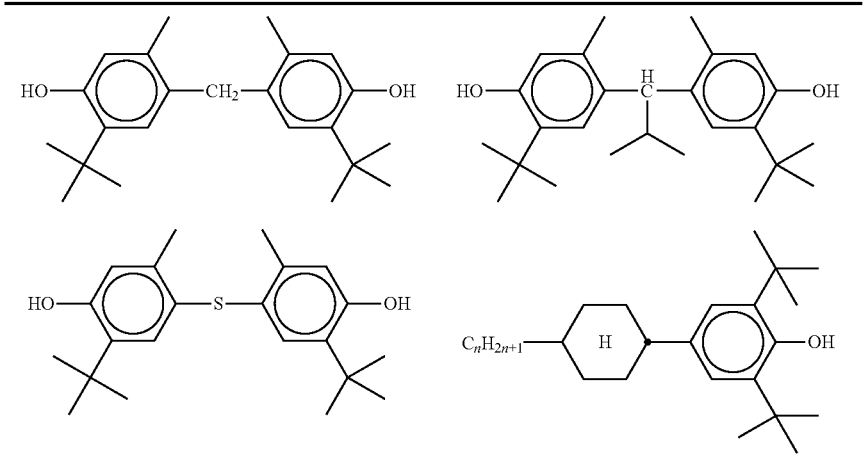

TABLE D-continued
Suitable stabilizers and antioxidants for LC mixtures are mentioned below
(n = 0-10, terminal methyl groups are not shown):
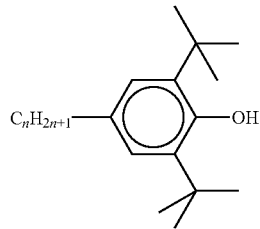 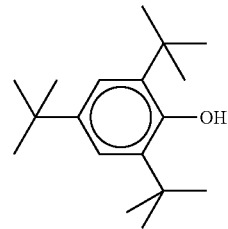
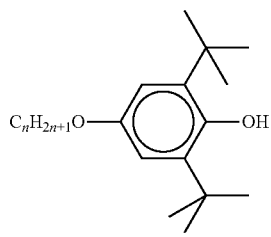 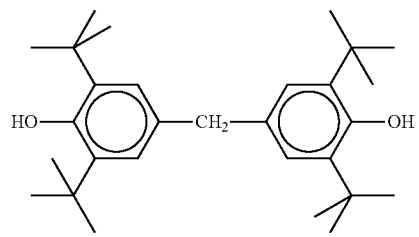
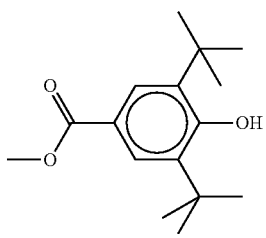 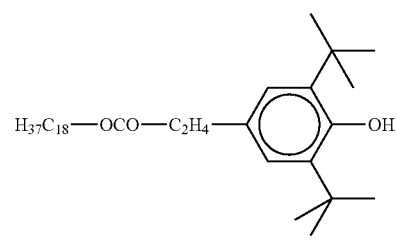
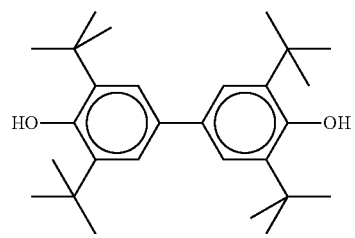
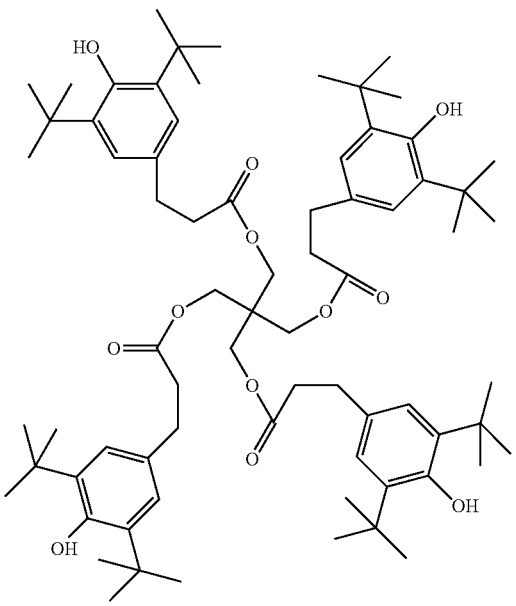 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Suitable stabilizers and antioxidants for LC mixtures are mentioned below
(n = 0-10, terminal methyl groups are not shown):
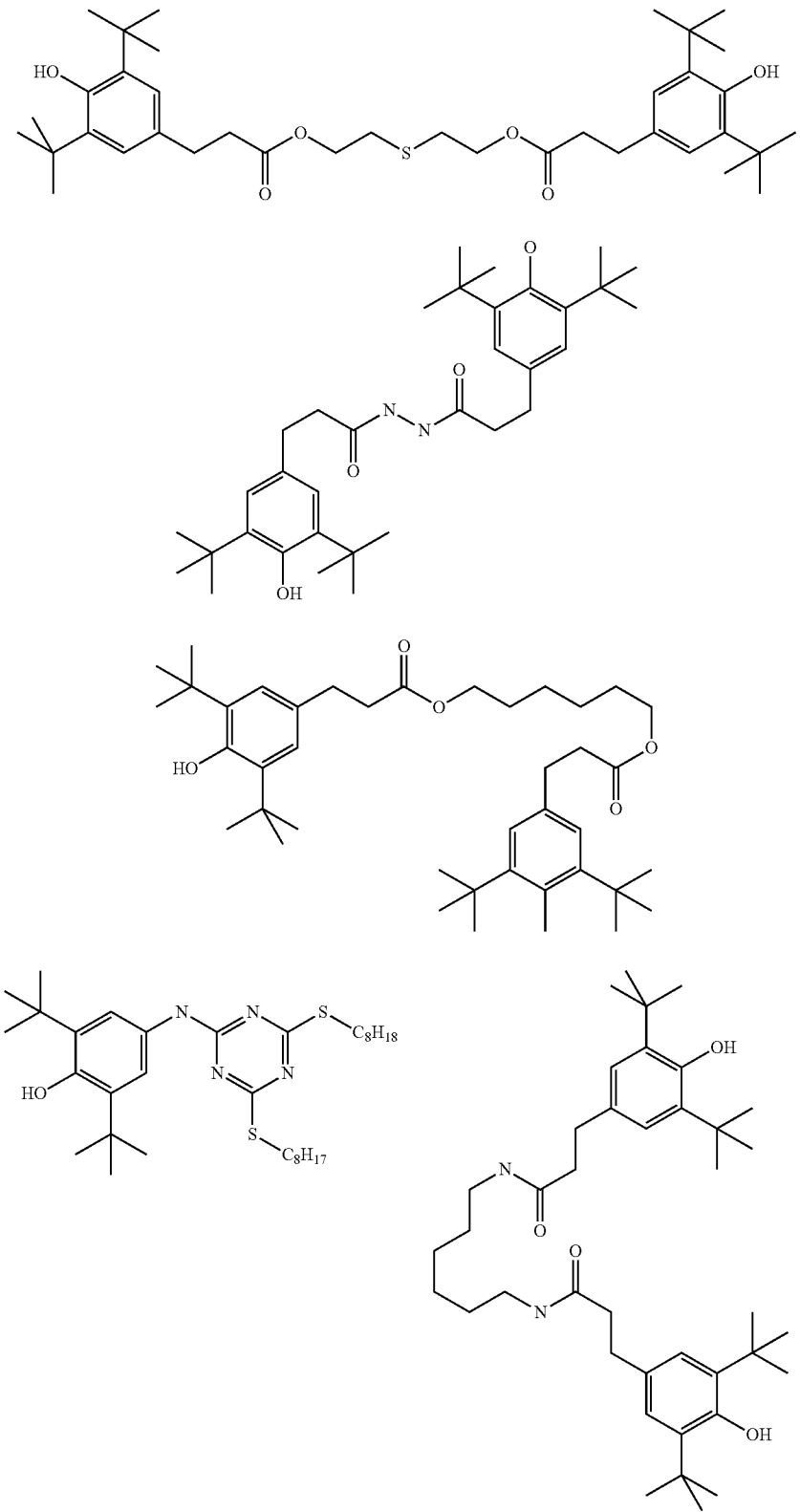

TABLE D-continued
Suitable stabilizers and antioxidants for LC mixtures are mentioned below
(n = 0-10, terminal methyl groups are not shown):
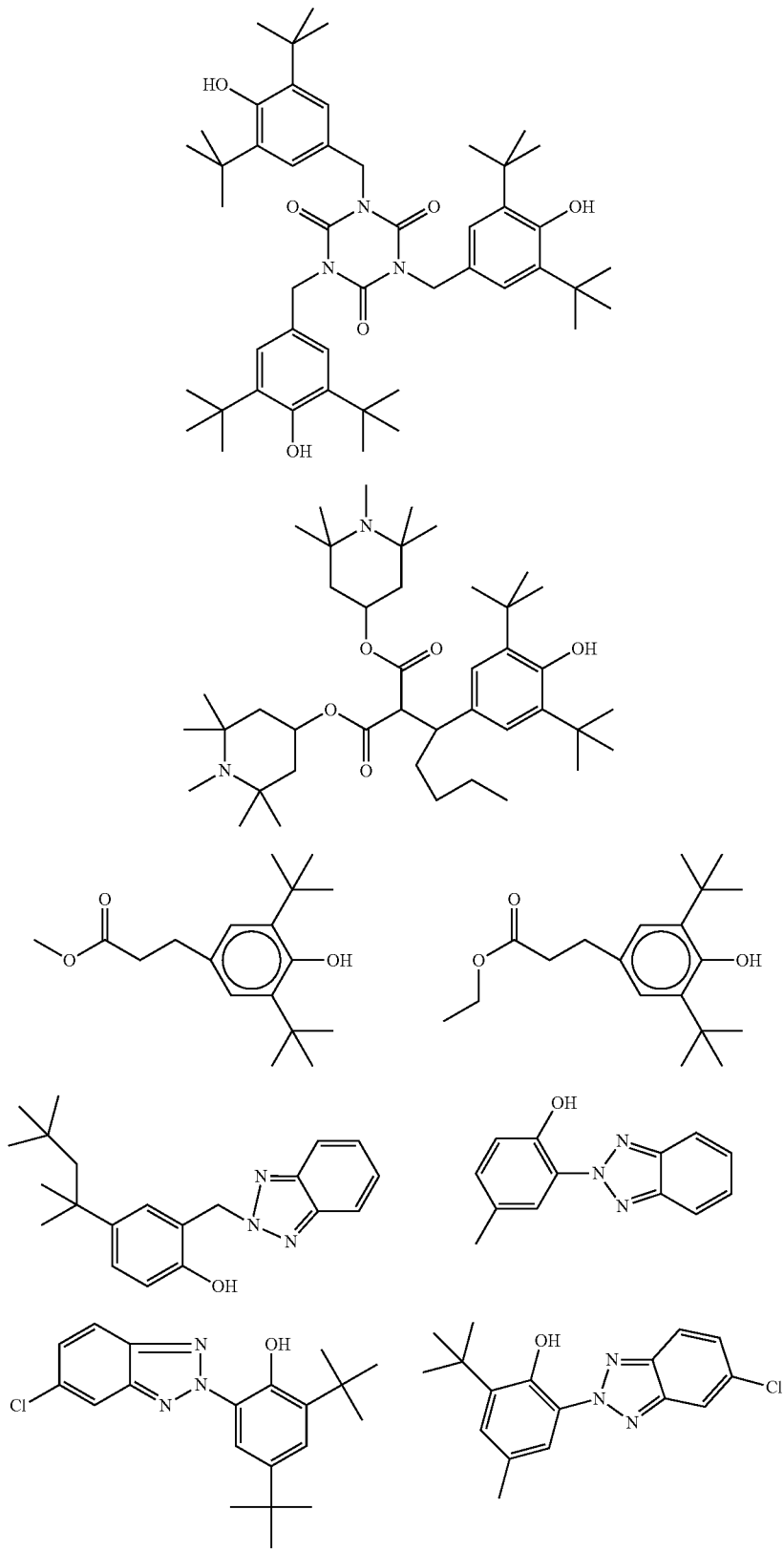

TABLE D-continued
Suitable stabilizers and antioxidants for LC mixtures are mentioned below
(n = 0-10, terminal methyl groups are not shown):
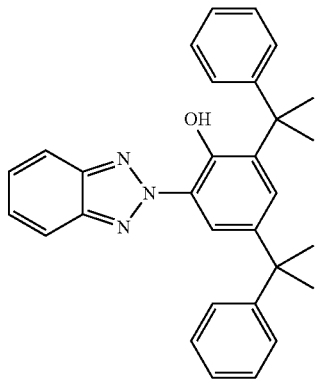 [SMILES: CC(C)(c1ccccc1)c1cc(-n2nc3ccccc3n2)c(O)c(C(C)(C)c2ccccc2)c1]
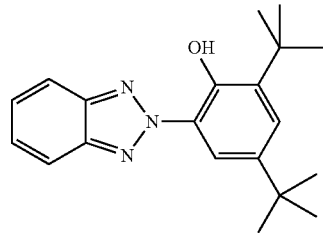 [SMILES: CC(C)(C)c1cc(-n2nc3ccccc3n2)c(O)c(C(C)(C)C)c1]
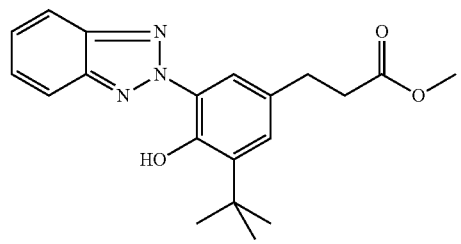 [SMILES: COC(=O)CCc1cc(-n2nc3ccccc3n2)c(O)c(C(C)(C)C)c1]
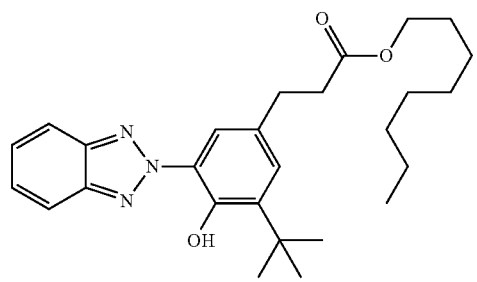 [SMILES: CCCCCCCCOC(=O)CCc1cc(-n2nc3ccccc3n2)c(O)c(C(C)(C)C)c1]
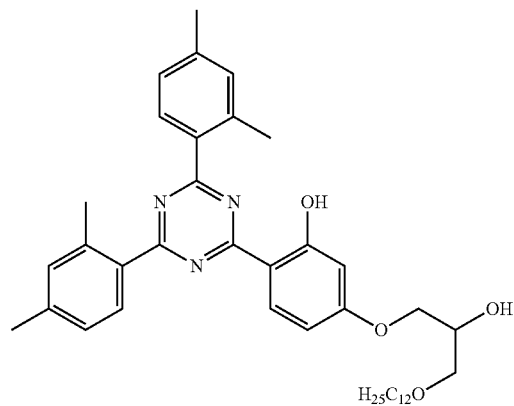

TABLE D-continued

Suitable stabilizers and antioxidants for LC mixtures are mentioned below
(n = 0-10, terminal methyl groups are not shown):

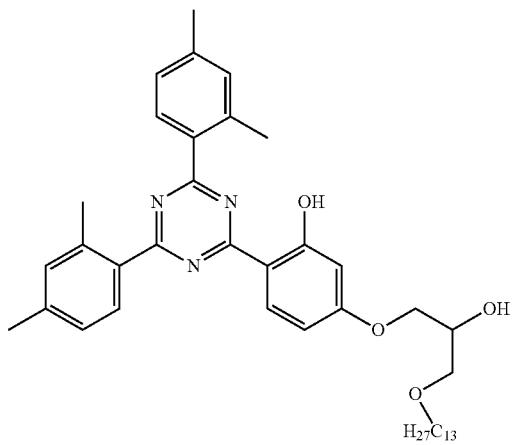

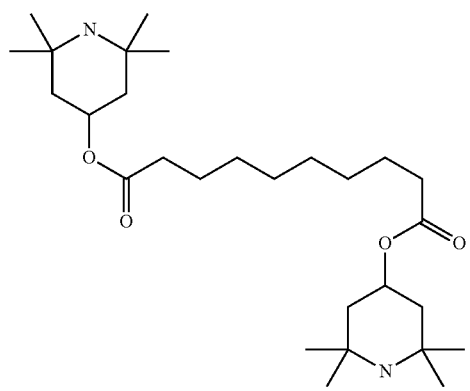

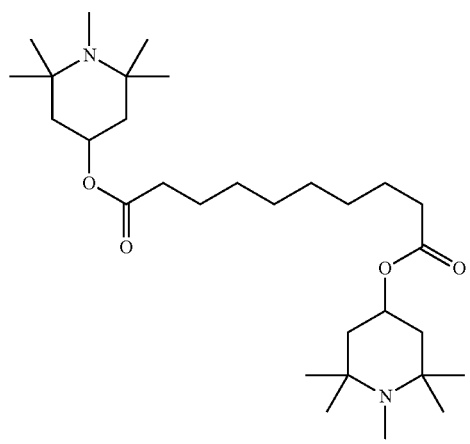

Above and below, percentages are per cent by weight All temperatures are given in degrees Celsius. m.p. denotes melting point, cl.p.=clearing point. Furthermore, C=crystalline state, S=smectic phase, N=nematic phase, Ch=cholesteric phase and I=isotropic phase. The data between these symbols represent the transition temperatures.

Furthermore, the following abbreviations are used:
Δn optical anisotropy at 589 nm and 20° C.
$n_e$ extraordinary refractive index at 589 nm and 20° C.
Δε dielectric anisotropy at 20° C.
$\varepsilon_\parallel$ dielectric constant parallel to the longitudinal molecular axes
$\gamma_1$ rotational viscosity [mPa·sec], at 20° C. unless stated otherwise
λ reflection wavelength [nm], at 20° C. unless stated otherwise
Δλ maximum variation of the reflection wavelength [nm] in the temperature range indicated, between −20 and +70° C. unless stated otherwise The helical twisting power HTP of a chiral compound which produces a helically twisted superstructure in a liquid-crystalline mixture is given by the equation HTP=$(p^* \cdot c)^{-1}$ [μm$^{-1}$], in which p denotes the helix pitch of the helically twisted phase in μm and c denotes the concentration of the chiral compound (a value of 0.01 for c corresponds, for example, to a concentration of 1% by weight). Unless stated otherwise, pitch, wavelength and HTP values above and below relate to a temperature of 20° C. and the commercially available neutral nematic TN host mixture MLC-6260 (Merck KGaA, Darmstadt).

The physical parameters are determined experimentally as described in "Licristal, Physical Properties Of Liquid Crystals, Description of the measurement methods", Ed. W. Becker, Merck KGaA, Darmstadt, revised edition, 1998.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention will now be described in more detail by reference to the following examples, which are illustrative only and do not limit the scope of the invention,

EXAMPLE 1A

The nematic mixture N1 is formulated as follows

| ME2N.F | 8.00% | cl.p. | 71 |
| ME3N.F | 8.00% | Δn | 0.2125 |
| ME4N.F | 16.00% | $n_e$ | 1.7253 |
| ME5N.F | 14.00% | Δε | +64.5 |
| DU-2-N | 8.00% | $ε_\parallel$ | 76.0 |
| HP-3N.F | 5.00% | | |
| HP-4N.F | 4.00% | | |
| HP-5N.F | 4.00% | | |
| PGUQU-3-F | 6.00% | | |
| PTP-102 | 3.00% | | |
| PPTUI-3-2 | 18.00% | | |
| PPTUI-3-4 | 6.00% | | |

The mixture has a very high positive dielectric anisotropy, a high birefringence, and a high clearing point, and is suitable for use as nematic component in a CLC mixture for SSCT displays with low threshold voltage.

EXAMPLE 1B

The CLC mixture C1 is formulated, consisting of 97.42% of the nematic component N1 of Example 1A, and 2.58% of the chiral dopant R-5011 of the following formula:

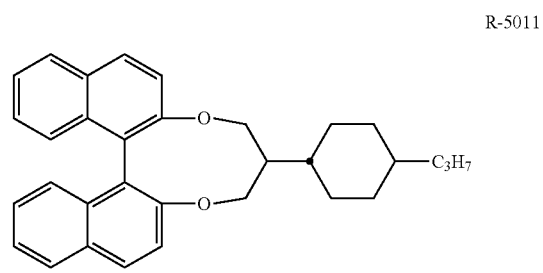

R-5011

The CLC mixture C1 has a reflection wavelength λ of 482 nm, and is suitable for use in an SSCT display.

EXAMPLE 2A

The nematic mixture N2 is formulated as follows

| ME2N.F | 8.00% | cl.p. | 72 |
| ME3N.F | 8.00% | Δn | 0.2313 |
| ME4N.F | 16.00% | $n_e$ | 1.7466 |
| ME5N.F | 14.00% | Δε | +55.3 |
| DU-2-N | 5.50% | $ε_\parallel$ | 65.3 |
| HP-3N.F | 5.00% | | |
| PGUQU-3-F | 6.00% | | |
| PTP-102 | 5.00% | | |
| PPTUI-3-2 | 20.00% | | |
| PPTUI-3-4 | 12.50% | | |

The mixture has a very high positive dielectric anisotropy, a high birefringence, and a high clearing point, and is suitable for use as nematic component in a CLC mixture for SSCT displays with low threshold voltage.

EXAMPLE 2B

The CLC mixture C2 is formulated, consisting of 97.29% of the nematic component N2 of Example 2A, and 2.71% of the chiral dopant R-5011. The CLC mixture C2 has a reflection wavelength λ of 486 nm, and is suitable for use in an SSCT display.

EXAMPLE 3

The nematic mixture N3 is formulated as follows

| ME2N.F | 8.00% | cl.p. | 70 |
| ME3N.F | 8.00% | Δn | 0.2283 |
| ME4N.F | 16.00% | $n_e$ | 1.7438 |
| ME5N.F | 14.00% | Δε | +55.5 |
| DU-2-N | 6.00% | $ε_\parallel$ | 65.6 |
| HP-3N.F | 5.00% | | |
| PGUQU-3-F | 6.00% | | |
| PTP-102 | 5.00% | | |
| PPTUI-3-2 | 18.00% | | |
| PPTUI-3-4 | 14.00% | | |

The mixture has a very high positive dielectric anisotropy, a high birefringence, and a high clearing point, and is suitable for use as nematic component in a CLC mixture for SSCT displays with low threshold voltage.

EXAMPLE 4A

The nematic mixture N4 is formulated as follows

| ME2N.F | 8.00% | cl.p. | 73 |
|---|---|---|---|
| ME3N.F | 8.00% | $\Delta n$ | 0.2017 |
| ME4N.F | 16.00% | $n_e$ | 1.7112 |
| ME5N.F | 13.00% | $\Delta \epsilon$ | +72.3 |
| DU-2-N | 8.00% | $\epsilon_\parallel$ | 85.2 |
| HP-3N.F | 5.00% | | |
| HP-4N.F | 5.00% | | |
| HP-5N.F | 4.00% | | |
| PGUQU-3-F | 6.00% | | |
| APUQU-3-F | 8.00% | | |
| PPTUI-3-2 | 19.00% | | |

The mixture has a very high positive dielectric anisotropy, a high birefringence, and a high clearing point, and is suitable for use as nematic component in a CLC mixture for SSCT displays with low threshold voltage.

EXAMPLE 4B

The CLC mixture C4 is formulated, consisting of 97.40% of the nematic component N4 of Example 4A, and 2.60% of the chiral dopant R-5011. The CLC mixture C4 has a reflection wavelength $\lambda$ of 458 nm, and is suitable for use in an SSCT display.

The preceding examples can be repeated with similar success by substituting the generically or specifically described reactants and/or operating conditions of this invention for those used in the preceding examples.

The invention claimed is:

1. A liquid-crystalline medium having a helically twisted structure comprising: a nematic component and an optically active component, wherein
    said optically active component comprises one or more chiral compounds whose helical twisting power and concentration are selected in such a way that the helix pitch of the medium is $\leq 1$ μm, and
    said nematic component comprises one or more compounds of formula I,

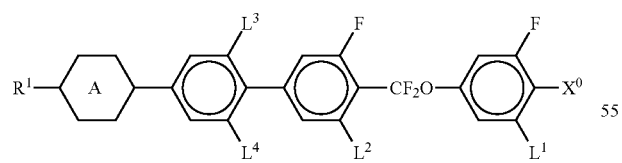

I in which
    $R^1$ is H or an alkyl or alkenyl radical having up to 20 carbon atoms which is unsubstituted, monosubstituted by CN or $CF_3$ or at least monosubstituted by halogen, and wherein one or more $CH_2$ groups are each, independently of one another, optionally replaced by —O—, —S—, —CO—, —CO—O—, —O—CO—, —O—CO—O—, —CH=CH— or —C≡C— in such a way that 0 atoms are not linked directly to one another,

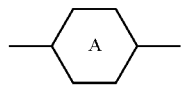

is

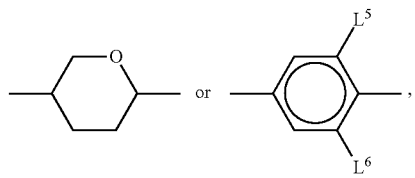

$X^0$ F, Cl or alkyl, alkenyl or alkoxy each of which is halogenated and has up to 6 C-atoms, and
$L^{1-6}$ are each, independently of one another, H or F.

2. A medium according to claim 1, wherein said nematic component additionally comprises one or more compounds of formula II and/or one or more compounds of formula III

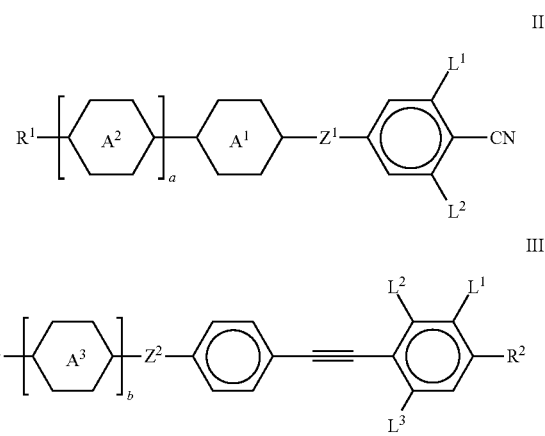

in which
    $R^1$ and $R^2$ independently of one another, are H or an alkyl or alkenyl radical having up to 20 carbon atoms which is unsubstituted, monosubstituted by CN or $CF_3$ or at least monosubstituted by halogen, and wherein one or more $CH_2$ groups are each, independently of one another, optionally replaced by —O—, —S—, —CO—, —CO—O—, —O—CO—, —O—CO—O—, —CH=CH— or —C≡C— in such a way that O atoms are not linked directly to one another,

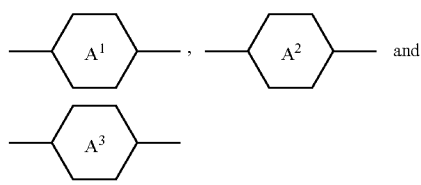

are, independently of one another,

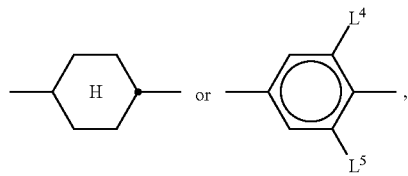

$Z^1$ is —COO—, —CH$_2$CH$_2$— or a single bond,
$Z^2$ is —COO—, —CH$_2$CH$_2$— or a single bond,
$L^{1-5}$ are each, independently of one another, H or F,
a and b are each, independently of one another, 0 or 1.

3. A medium according to claim 1, wherein said medium comprises one or more compounds selected from the following formulae

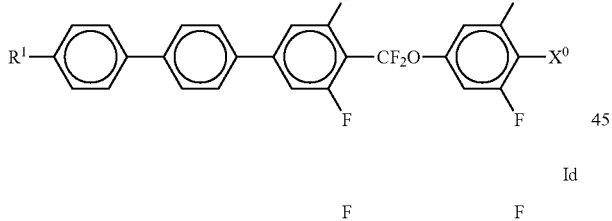

Ia

Ib

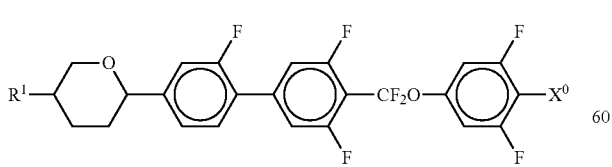

Ic

Id

Ie wherein $R^1$ and $X^0$ are as defined in claim 1.

4. A medium according to claim 1, wherein said medium additionally comprises one or more compounds selected from the following formulae

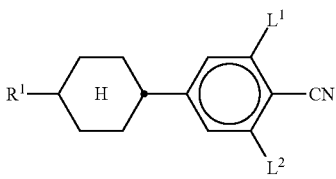

IIa

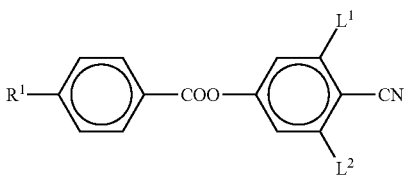

IIb

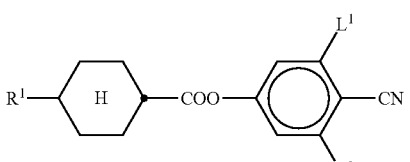

IIc

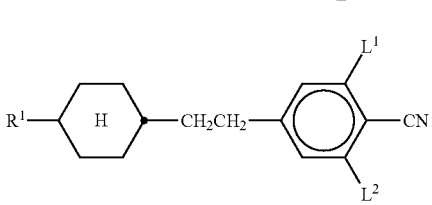

IId

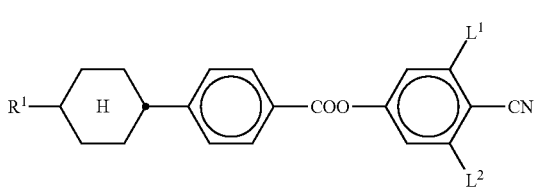

IIe

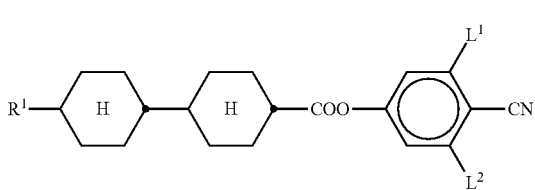

IIf in which $R^1$, $L^1$ and $L^2$ are as defined in claim 1.

5. A medium according to claim 1, wherein said medium additionally comprises one or more compounds selected from the following formulae IIIa

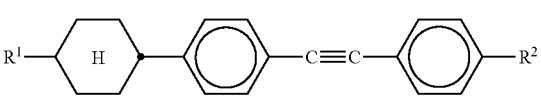

IIIb

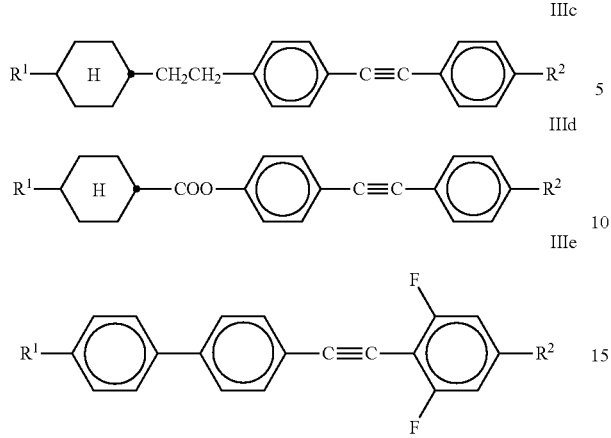

in which $R^1$ and $R^2$ each, independently of one another, have one of the meanings given in claim 1.

6. A medium according to claim 1, wherein said medium additionally comprises one or more compounds of formula D

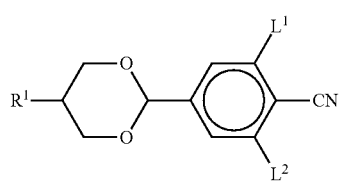

in which $R^1$, $L^1$ and $L^2$ have the meanings given in claim 1.

7. A medium according to claim 1, wherein said medium comprises one or more chiral compounds of the following formula:

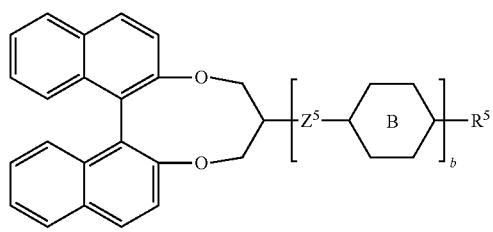

in which

B is 1,4-phenylene, which may also be mono-, di- or trisubstituted by L, or 1,4-cyclohexylene, L is H, F, Cl, CN or optionally halogenated alkyl, alkoxy, alkyl-carbonyl, alkoxycarbonyl, alkylcarbonyloxy or alkoxycarbonyloxy, in each case having up to 7 carbon atoms, b is 0, 1 or 2, $Z^5$ is —COO—, —OCO—, —CH$_2$CH$_2$— or a single bond, and $R^5$ is alkyl, alkoxy, alkylcarbonyl, alkoxycarbonyl or alkylcarbonyl-oxy, in each case having up to 12 carbon atoms.

8. A medium according to claim 1, wherein said medium has a reflection wavelength in the range from 400 to 800 nm.

9. A medium according to claim 1, wherein the helix pitch of the medium is from 130 nm to 1000 nm.

10. A medium according to claim 9, wherein the helix pitch of the medium is from 200 nm to 750 nm.

11. A medium according to claim 9, wherein the helix pitch of the medium is from 300 nm to 450 nm.

12. A medium according to claim 1, wherein the temperature dependence dλ/dT of 0.6 nm/° C. or less, in the range of at least between 0 and 50° C.

13. A medium according to claim 12, wherein the temperature dependence dλ/dT of 0.3 nm/° C. or less, in the range of at least between 0 and 50° C.

14. A medium according to claim 12, wherein the temperature dependence dλ/dT of 0.15 nm/° C. or less, in the range of at least between 0 and 50° C.

15. Medium according to claim 1, wherein the birefringence Δn of the medium is ≧0.15.

16. Medium according to claim 15, wherein the birefringence Δn of the medium is ≧0.20.

17. A method of generating an electro-optical effect using an electro-optical display element containing a medium according to claim 1 for electro-optical purposes.

18. An electro-optical liquid-crystal display containing a medium according to claim 1.

19. An electro-optical liquid-crystal display according to claim 18, wherein said display is a cholesteric display, SSCT display or PSCT display.

* * * * *